(12) United States Patent
Wang et al.

(10) Patent No.: US 10,818,064 B2
(45) Date of Patent: Oct. 27, 2020

(54) ESTIMATING ACCURATE FACE SHAPE AND TEXTURE FROM AN IMAGE

(71) Applicant: Intel Corporation, Santa Clara, CA (US)

(72) Inventors: Shandong Wang, Beijing (CN); Ming Lu, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/327,779

(22) PCT Filed: Sep. 21, 2016

(86) PCT No.: PCT/CN2016/099560
§ 371 (c)(1),
(2) Date: Feb. 22, 2019

(87) PCT Pub. No.: WO2018/053703
PCT Pub. Date: Mar. 29, 2018

(65) Prior Publication Data
US 2019/0228556 A1 Jul. 25, 2019

(51) Int. Cl.
*G06T 13/40* (2011.01)
*G06T 17/00* (2006.01)
(Continued)

(52) U.S. Cl.
CPC ............... *G06T 13/40* (2013.01); *G06F 3/01* (2013.01); *G06T 15/04* (2013.01); *G06T 15/10* (2013.01); *G06T 17/00* (2013.01)

(58) Field of Classification Search
None
See application file for complete search history.

(56) References Cited

U.S. PATENT DOCUMENTS

| 6,556,196 | B1 * | 4/2003 | Blanz | G06K 9/00275 |
| | | | | 345/419 |
| 7,643,685 | B2 * | 1/2010 | Miller | G06K 9/00208 |
| | | | | 299/1.4 |

(Continued)

FOREIGN PATENT DOCUMENTS

| CN | 101320484 | 12/2008 |
| CN | 103430218 | 12/2013 |

(Continued)

OTHER PUBLICATIONS

Bas, Anil, et al. "Fitting a 3D morphable model to edges: A comparison between hard and soft correspondences." Asian Conference on Computer Vision. Springer, Cham, 2016.*

(Continued)

*Primary Examiner* — Sultana M Zalalee
(74) *Attorney, Agent, or Firm* — Green, Howard, & Mughal LLP

(57) ABSTRACT

Techniques related to estimating accurate face shape and texture from an image having a representation of a human face are discussed. Such techniques may include determining shape parameters that optimize a linear spatial cost model based on 2D landmarks, 3D landmarks, and camera and pose parameters, determining texture parameters that optimize a linear texture estimation cost model, and refining the shape parameters by optimizing a nonlinear pixel intensity cost function.

22 Claims, 8 Drawing Sheets

(51) Int. Cl.
   *G06F 3/01*     (2006.01)
   *G06T 15/04*    (2011.01)
   *G06T 15/10*    (2011.01)

(56) References Cited

U.S. PATENT DOCUMENTS

| | | | |
|---|---|---|---|
| 2006/0067573 A1* | 3/2006 | Parr | G06K 9/00201 382/154 |
| 2007/0031028 A1* | 2/2007 | Vetter | G06K 9/00208 382/154 |
| 2007/0091085 A1* | 4/2007 | Wang | G06T 17/20 345/420 |
| 2010/0134487 A1 | 6/2010 | Lai et al. | |
| 2010/0214288 A1* | 8/2010 | Xiao | G06K 9/621 345/420 |
| 2011/0075916 A1* | 3/2011 | Knothe | G06K 9/00201 382/154 |
| 2013/0201187 A1 | 8/2013 | Tong et al. | |
| 2014/0043329 A1 | 2/2014 | Wang et al. | |
| 2015/0055085 A1* | 2/2015 | Fonte | H04N 5/23219 351/178 |
| 2015/0235378 A1* | 8/2015 | Rhee | G06T 19/006 345/633 |
| 2015/0279044 A1* | 10/2015 | Kim | G06K 9/00268 345/419 |
| 2015/0310673 A1* | 10/2015 | Romdhani | G06K 9/00275 345/420 |
| 2016/0125609 A1 | 5/2016 | Justice et al. | |
| 2016/0148425 A1* | 5/2016 | Hwang | G06T 15/04 345/419 |
| 2016/0148435 A1* | 5/2016 | Li | G06T 19/20 715/835 |
| 2016/0364867 A1* | 12/2016 | Moteki | G06T 7/73 |
| 2018/0005448 A1* | 1/2018 | Choukroun | G06T 19/20 |
| 2018/0039864 A1 | 2/2018 | Yao et al. | |
| 2018/0137383 A1 | 5/2018 | Yao et al. | |
| 2018/0184072 A1* | 6/2018 | Yoshimura | G06T 15/205 |

FOREIGN PATENT DOCUMENTS

| | | |
|---|---|---|
| CN | 103765479 | 4/2014 |
| CN | 104036546 | 9/2014 |
| WO | 2017161561 | 9/2017 |

OTHER PUBLICATIONS

Lee, Youn Joo, et al. "Single view-based 3D face reconstruction robust to self-occlusion." EURASIP Journal on Advances in Signal Processing Jan. 2012 (2012): 176.*
International Search Report and Written Opinion for International Patent Application No. PCT/CN2016/099560, dated Apr. 28, 2017.
Aldrian, O. et al., "Inverse Rendering of Faces with a 3D Morphable Model", IEEE Transactions on Pattern Analysis and Machine Intelligence; vol. 35, No. 5; pp. 1080-1093; May 2013.
Blanz, V. et al., "A Morphable Model for the Synthesis of 3D Faces", Siggraph 99; Proceedings of the 26th annual conference on Computer graphics and interactive techniques; pp. 187-194; 1999.
Cao, C. et al., "Displaced Dynamic Expression Regression for Real-time Facial Tracking and Animation", Journal of ACM Transactions on Graphics (TOG); vol. 33, Iss 4; No. 43; 10 pages; Jul. 2014.
Hu, G.,"Face Analysis using 3D Morphable Models", Submitted for the Degree of Doctor of Philosophy from the University of Surrey; Apr. 2015.
Paysan, P. et al., "A 3D Face Model for Pose and Illumination Invariant Face Recognition", Sixth IEEE International Conference on Advanced Video and Signal Based Surveillance; 6 pages; 2009.
Press, W.H. et al., "Numerical Recipes in C: The Art of Scientific Computing", Second Edition; Cambridge Univerity Press; 1992.
Romdhani, S. et al., "Estimating 3D shape and texture using pixel intesity, edges, specular highlights, texture constraints and a prior", IEEE Computer Society Conference on Computer Vision and Pattern Recognition (CVPR'05); 8 pages; Jun. 2005.
Struc, V. et al., "Photometric normalization techniques for illumination invariance", Advances in Face Image Analysis: Techniques and Technologies; IGI Global, pp. 279-300; 2011.
International Preliminary Report on Patentability for PCT Application No. PCT/CN2016/099560, dated Apr. 4, 2019.

* cited by examiner

ESTIMATING ACCURATE FACE SHAPE AND TEXTURE FROM AN IMAGE

CLAIM OF PRIORITY

This Application is a National Stage Entry of, and claims priority to, PCT Application No. PCT/CN16/99560, filed on 21 Sep. 2016 and titled "ESTIMATING ACCURATE FACE SHAPE AND TEXTURE FROM AN IMAGE", which is incorporated by reference in its entirety for all purposes.

BACKGROUND

Estimating three-dimensional (3D) face shape from one or more input images is an important aspect of the field of face analysis. The motivation for work in improving the estimation of 3D face shapes is that the reconstructed 3D face shape provides a pose and illumination invariant description of a face. Such a representation of a face is important in many applications such as face recognition, face relighting, face beautification, facial animation, face tracking across 3D poses, facial expression transfer from one image to another image, and so on. Such estimation of 3D face shapes is difficult because, among other reasons, it involves a highly non-convex cost function and often suffers from a local minima problem.

A 3D morphable model (3DMM) is a tool for 3D face reconstruction from an image. The 3DMM may include two models, one for shape and one for texture, such that a face can be approximated as a linear combination of the two models. For example, the morphable model can be fit to an input image by varying the parameters of the model such that fitting the morphable model to a face of an impute image may include solving a minimization problem, which requires estimation of many model parameters.

Existing 3DMM fitting techniques can be classified into two categories: those that use nonlinear cost functions and those with linear cost functions. Techniques that fall into the first category typically define a complex cost function and apply a nonlinear solver to jointly or iteratively solve for the parameters. In one nonlinear cost function technique, the multiple features fitting (MFF) strategy, attempts to reduce the local minimum problem by using various features such as pixel intensity, edges, specular highlights, and texture constraints to jointly constrain the fitting process. Drawbacks of the MFF strategy and other nonlinear cost function techniques include low efficiency requiring several minutes to fit an input image and limitations in the facial component fitting accuracy. Linear cost function techniques typically use only anchor points like eye or mouth corners to estimate pose and fit shape and use pixel values to fit an albedo and light model. For example, these steps can be applied separately and iteratively. Although the fitting speed can be fast, such techniques have limited shape fitting accuracy due to only using sparse geometric features. Furthermore, current 3DMM fitting techniques, both linear and nonlinear, require human intervention in the fitting process.

Therefore, current techniques for estimating face shape and texture from an image are deficient. For example, current techniques may be too slow to support real time implantation, have low accuracy, or may require human intervention. It is with respect to these and other considerations that the present improvements have been needed. Such improvements may become critical as the implementation morphable face models in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
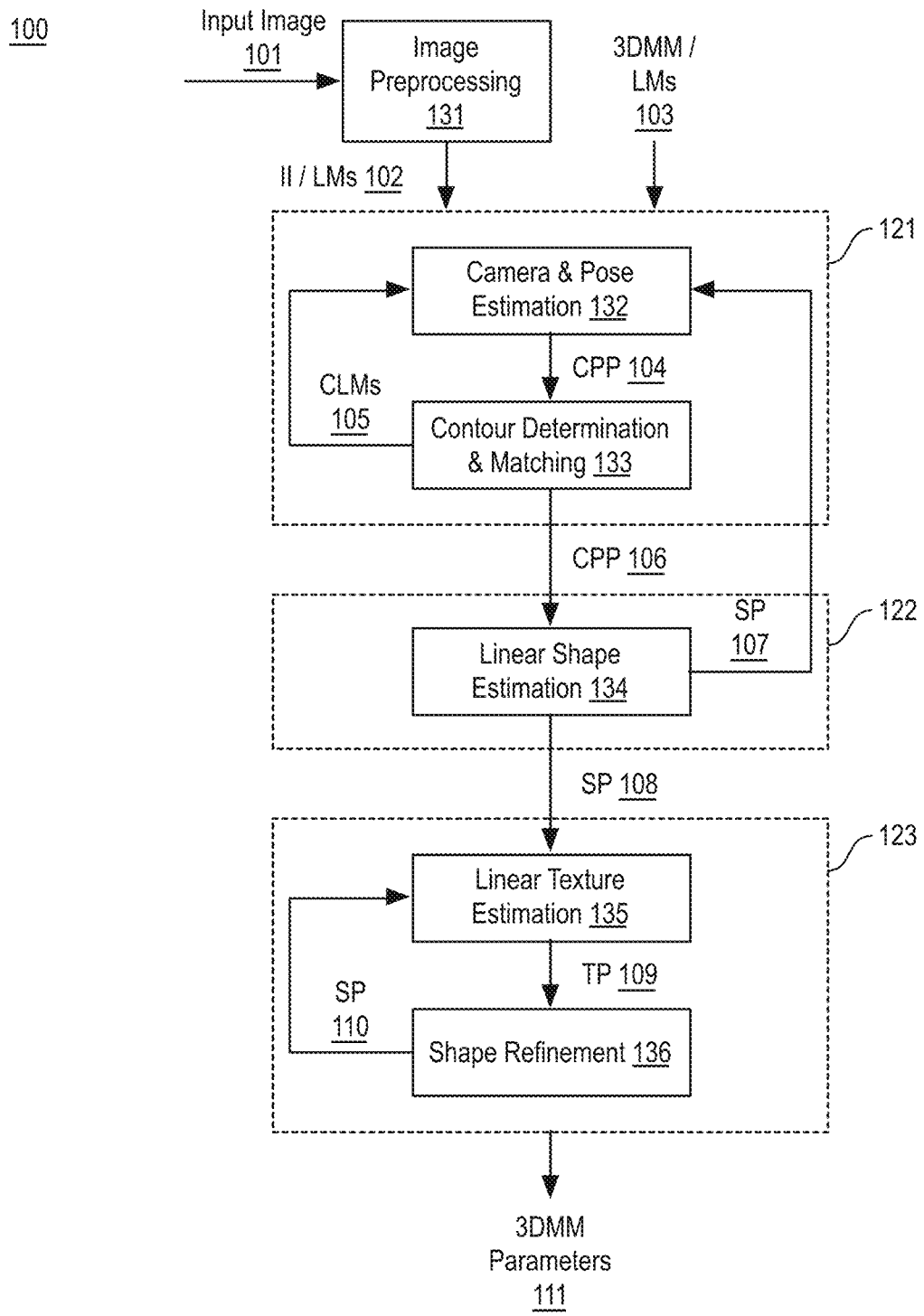
FIG. 1 illustrates an example system for implementing a 3D morphable face model.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to determining shape and texture parameters for a 3D morphable face model.

As described above, it may be desirable to estimate a 3D face shape and texture by determining parameters of a morphable model with high speed and accuracy. The resultant 3D morphable model or parameters for such a morphable model or the like may be used in many applications such as face detection, face recognition, 3D face reconstruction, face analysis, face relighting, face beautification, digital face makeup, 2D/3D face mesh generation, facial animation (e.g., for gaming, avatar video chat, or the like), facial feature tracking, face tracking across 3D poses, facial expression transfer from one image to another image, or the like. The techniques discussed herein may provide for facial landmark detection, morphable model fitting, and similar techniques. For example, techniques discussed herein may provide a compact association of linear and nonlinear optimizations for estimating an accurate 3D face shape from an image such as a single input image.

As discussed herein, embodiments may include processing an input image having a representation of a human face. The input image may be preprocessed to determine 2D landmarks for the human face. Based on a 3D morphable face model, shape parameters that optimize a linear spatial estimation cost model may be determined. For example, the linear spatial estimation cost model may be based on the 2D facial landmarks corresponding to the human face, corresponding 3D facial landmarks of the 3D morphable face model as implemented with the shape parameters, and camera and pose parameters to align the 2D facial landmarks and the 3D facial landmarks. For example, the camera and pose parameters that align the 2D facial landmarks and the 3D facial landmarks may be determined as discussed. For example, the camera and pose parameters may attempt to align the 2D facial landmarks and 3D facial landmarks of the 3D morphable face model implemented with initial shape parameters. After determining the shape parameters, improved camera and pose parameters and improved shape parameters may be determined iteratively a predetermined number of times such as twice or three times or the like.

Texture parameters may then be determined that optimize a linear texture estimation cost model. For example, the linear texture estimation cost model may be based on pixel colors of the input image at a plurality of locations and pixel colors of corresponding locations of the 3D morphable face model as implemented with the shape parameters and the texture parameters. The shape parameters (determined iteratively for example) may then be refined by optimizing a nonlinear pixel intensity cost function. For example, the nonlinear pixel intensity cost function may be based on pixel intensity values of the input image at a plurality of locations and pixel intensity values of corresponding locations of the 3D morphable face model as implemented with the refined shape parameters and the texture parameters. Such texture parameters determination and nonlinear shape parameter refinement may optionally be iterated a predetermined number of times such as twice or three times or the like. The finalized texture parameters and refined shape parameters for the 3D morphable face model corresponding to the input image may then be stored to memory storage and/or implemented in an application such as a face recognition application, a face relighting application, a face beautification application, a facial animation application, a face tracking across 3D poses application, a facial expression transfer application, or the like.

The techniques discussed herein provide a 3D morphable face model (e.g., 3D morphable model, 3DMM) fitting method that automatically (e.g., without human intervention) determines shape and texture parameters for the 3D morphable face model with high accuracy and efficiency. The techniques may include a combination of a linear shape estimation and nonlinear shape refinement together with linear texture estimation. For example, facial landmarks may first be used to provide geometric constraints to estimate pose and fit shape and then pixel intensity (e.g., pixel intensity features) may be used to provide photometric constrains to estimate texture and refine the shape.

In an embodiment, correspondence between 2D and 3D landmarks may be used to estimate camera and pose parameters and then shape parameters may be determined using a linear method that assumes the camera perspective. Such steps may be iterated or repeated two or more times to get a stable result for the shape parameters of the 3D morphable face model. The stable shape parameters may then be refined using a nonlinear model. Such techniques may provide fitting in a coarse-to-fine manner, which provides efficient and accurate fitting results. For example, the techniques discussed herein may integrate face alignment and, based on corresponding 2D-3D landmarks, linear estimation based on perspective camera imaging (e.g., based on camera and pose parameters) to fit the shape of the 3D morphable face model. Such techniques may provide coarse estimation without or with minimal manual assistance and improved fitting accuracy for faces that are close to the camera (e.g., large in the input image including a representation of a human face). In an embodiment, the input image including a human face may be preprocessed using image smoothing and/or illumination normalization. In an embodiment, the discussed nonlinear shape refinement may include a multiple rendering targets (MRT) technique to render the face image and generating a texture map including the triangle index corresponding to the pixel. Based on the map the triangles that are visible and correspond to salient face feature pixels may be selected for inclusion in optimizing the nonlinear cost function. Such techniques may increase the speed of the convergence process. Furthermore, the coarse shape fitting using linear techniques provides a good initialization for the subsequent nonlinear shape refinement to provide high efficiency and accuracy.

FIG. 1 illustrates an example system 100 for implementing a 3D morphable face model, arranged in accordance with at least some implementations of the present disclosure. As shown in FIG. 1, system 100 may include an image preprocessing module 131, a camera and pose estimation module 132, a contour determination and matching module 133, a linear shape estimation module 134, a texture estimation module 135, and a shape refinement module 136. Also as shown, camera and pose estimation module 132 and contour determination and matching module 133 may be implemented as a first stage 121, linear shape estimation module 134 may be implemented as a second stage 122, and texture estimation module 135 and a shape refinement module 136 may be implemented as a third stage 123. System 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, system 100 may provide at least a portion of an image signal processing pipeline that may be implemented in hardware, software, or a combination thereof. As discussed, system 100 may provide implementing a 3D morphable face model. As shown, system 100 may receive an input image 101 including a representation of a human face and a 3D morphable face model with 3D landmarks (3DMM/LMs) 103 and system 100 may generate 3D morphable face model (3DMM) parameters 111 that may be stored for use by any suitable application as discussed herein. For example, system 100 may determine 3D morphable face model parameters that best match 3D morphable face model 103, when implemented with 3D morphable face model parameters 111 to the face represented by input image 101.

As shown, image preprocessing module 131 may receive input image 101. Input image 101 may include any suitable image or image data in any suitable format. In an embodiment, input image 101 includes data for pixels thereof (e.g., pixel values) in one or more luma and/or color channels such as in RGB color channels or the like. Input image 101 may include any number of representations of a human face or faces. In an embodiment, input image 101 includes a single representation of a single human face and system 100 generates 3D morphable face model parameters 111 based on a single input image.

Image preprocessing as performed by image preprocessing module 131 may include any suitable image preprocessing and/or any suitable facial landmark detection techniques to generate input image with 2D landmarks (II/LMs) 102. In an embodiment, the image preprocessing of input image 101 includes image smoothing such as image filtering or the like. In an embodiment, image smoothing preprocessing is applied in response to input image 101 containing noise and/or being rich in texture detail. In addition or in the alternative, the image preprocessing of input image 101 may include illumination normalization techniques or the like. In an embodiment, illumination normalization preprocessing is applied in response to input image 101 containing lighting effects. Furthermore, landmark detection may be performed based on input image 101 to generate 2D landmarks corresponding to the face represented by input image 101. Such landmark detection may be performed using any suitable technique or techniques such as 2D facial feature alignment techniques, edge detection techniques, deep multitask learning techniques, feature detection cascades, or the like.

Figure 2:
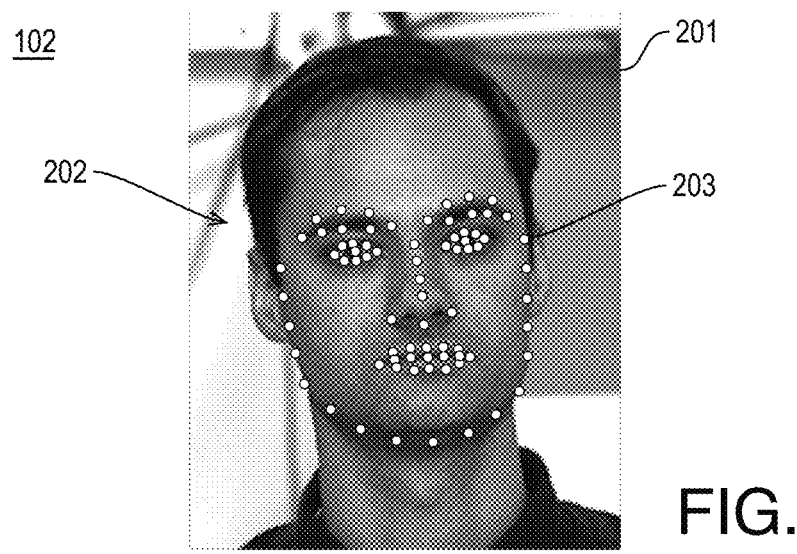
FIG. 2 illustrates an example input image with 2D landmarks.

FIG. 2 illustrates an example input image with 2D landmarks 102, arranged in accordance with at least some implementations of the present disclosure. As shown in FIG. 2, input image with 2D landmarks 102 includes an image 201 having a representation of a human face 202 and 2D landmarks 203 (each labeled as solid white circles). In the illustrated embodiment, 2D landmarks 203 correspond to features or feature points of eyebrows, eyes, a nose, a mouth, and a facial contour of human face 202. However, 2D landmarks 203 may correspond to additional features and/or some features may not be represented. Furthermore, image 201 may have been optionally preprocessed as discussed for smoothing, illumination normalization, or the like.

Returning to FIG. 1, as shown, input image with 2D landmarks 102 may be provided to first stage 121. In an embodiment, input image with 2D landmarks 102 is presented to a user via a display (not shown) such that a user may manipulate the 2D landmarks and or the image via an input device (not shown). However, such presentment to a user is optional and the techniques discussed herein may generate 3D morphable face model parameters 111 automatically.

Also as shown in FIG. 1, 3D morphable face model with 3D landmarks 103 may also be provided to first stage 121. The 3D morphable face model may be any suitable 3D model that is morphable based on parameters being implemented by the model. In an embodiment, the 3D morphable face model includes multiple models such as two principle component analysis (PCA) models with one model for the shape and one model for the texture. Based on such a 3D morphable face model, a wide variety of faces can be approximated or represented as a linear combination of the models as varied based on shape and texture parameters. In an embodiment, the 3D morphable face model includes shape and texture models as provided by Equations (1):

$$S = \bar{s} + \sum_{i=1}^{m-1} \alpha_i \cdot s_i \quad (1)$$

$$T = \bar{t} + \sum_{i=1}^{m-1} \beta_i \cdot t_i$$

where m is the number of face scans or indices, $\bar{s}$ and $\bar{t}$ are means of shape and texture, respectively, $\alpha=[\alpha_1, \alpha_2, \ldots, \alpha_{m-1}]^T$ and $\beta=[\beta_1, \beta_2, \ldots, \beta_{m-1}]^T$ are shape and texture parameters, respectively, and $s_i$ and $t_i$ are defined as $i^{th}$ variance-normalized eigenvectors.

Furthermore, 3D morphable face model with 3D landmarks 103 includes 3D landmarks corresponding to facial features of the 3D morphable face model. As used herein 2D landmarks indicate landmarks corresponding to an input image as provided in 2D and 3D landmarks indicate landmarks corresponding to a 3D morphable face model as provided in 3D. As will be apparent, a translation of such landmarks between 2D and 3D systems may be made (e.g., by projecting the 3D landmarks onto a 2D image plane or the like). Furthermore, correspondences between 2D and 3D landmarks may be established such that the 3D landmarks of the 3D morphable face model as implemented with shape parameters attempt to match their 2D landmark counterparts, as is discussed further herein. The 3D landmarks of the 3D morphable face model may be provided using any suitable technique or techniques. In an embodiment, the portion of the 3D morphable face model representing a 3D landmark (e.g., a point of the model, a rendered triangle of the model, or the like) may be predefined. In an embodiment, the 3D landmarks of the 3D morphable face model as provided by 3D morphable face model with 3D landmarks 103 may include only internal facial landmarks such that outer or contour landmarks are generated automatically as is discussed further herein. As used herein, internal facial landmarks are landmarks that correspond to internal facial features such as eyes, eyebrows, a nose, a mouth, or the like. They may be contrasted with contour facial landmarks that correspond to contours (e.g., outer edges or the like) of a face such as contours of a jawline, a hairline, a top of a head, or the like.

Figure 3:
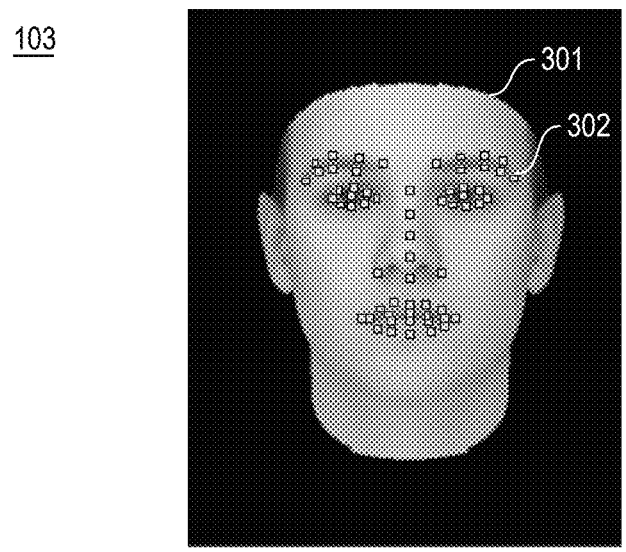
FIG. 3 illustrates an example 3D morphable face model with 3D landmarks.

FIG. 3 illustrates an example 3D morphable face model with 3D landmarks 103, arranged in accordance with at least some implementations of the present disclosure. As shown in FIG. 3, 3D morphable face model with 3D landmarks 103 may include a 3D morphable face model 301 implemented with initial parameters and associated 3D landmarks 302 (each labeled as a solid gray square). In the illustrated embodiment, 3D landmarks 302 are internal facial landmarks corresponding to eyebrows, eyes, a nose, and a mouth of 3D morphable face model 301. However, 3D landmarks 302 may correspond to additional features and/or some features may not be represented. In an embodiment, some or all of 3D landmarks 302 have a corresponding internal facial landmarks of 2D landmarks 203 (please refer to FIG. 2).

Returning to FIG. 1, as discussed, system 100 may include first stage 121, second stage 122, and third stage 123. For example, processing may be performed in stages such that in first stage 121, camera and pose parameters are estimated using landmark features, in second stage 122, shape parameters are estimated using a linear modeling techniques based on the perspective camera imaging, and in third sage 123, pixel intensity features may be used to estimate texture parameters and refine the shape parameters. Such stages 121-123 may include several iterated operations to improve the estimation of 3D morphable face model parameters 111.

As shown with respect to first stage 121, camera and pose estimation module 132 may receive input image with 2D landmarks 102 and 3D morphable face model with 3D landmarks 103 and camera and pose estimation module 132 may generate camera and pose parameters 104.

Camera and pose estimation module 132 may generate camera and pose parameters 104 using any suitable technique or techniques. In an embodiment, camera and pose parameters 104 are generated based on aligning internal facial 3D landmarks 302 and the internal facial landmarks of 2D landmarks 203. For example, camera and pose estimation module 132 may use the correspondence between the internal facial landmarks of 2D landmarks 203 and internal facial 3D landmarks 302 to estimate camera and pose parameters 104 that align 3D morphable face model 301 implemented using initial shape and texture parameters (e.g., mean parameters). As used herein, the term align is meant to indicate landmarks, features, or the like are brought closer to one another although perfect alignment may not be achieved. For example, 3D morphable face model 301 implemented using mean parameters may be characterized as a mean face model or the like. In an embodiment, the initial shape and texture parameters may all be zero. In an embodiment, to render a face image from a 3D morphable face model, the 3D shape is projected to a 2D image frame (e.g., by camera and pose estimation module 132 or a rendering component or the like of system 100). Any suitable rendering pipeline may be used to render the face image from the 3D morphable face model (e.g., to provide facial image synthesis). In an embodiment, the rendering may include a vertex transformation including two steps: a rigid transformation M and perspective projection P as provided by Equations (2) and (3):

$$M: X^{3d} \to X_c^{3d} \begin{bmatrix} X_c \\ Y_c \\ Z_c \\ 1 \end{bmatrix} = \begin{bmatrix} R & T \\ 0^T & 1 \end{bmatrix} \cdot \begin{bmatrix} X \\ Y \\ Z \\ 1 \end{bmatrix} \quad (2)$$

$$P: X_c^{3d} \to x^{2d} \begin{cases} x = f\dfrac{X_c}{Z_c} + x_0 \\ y = f\dfrac{Y_c}{Z_c} + y_0 \end{cases} \quad (3)$$

where $R=R_\gamma R_\varphi R_\theta \in \mathbb{R}^{3\times3}$ denotes the rotation matrix by rotating certain angles along the three axis, $T=[t_x, t_y, t_z]^T$ denotes the translation matrix, f is the focal length of the camera, and $(x_0, y_0)$ is the image-plane position of the optical axis.

In an embodiment, camera and pose parameters 104, $\rho=\{\theta, \varphi, \gamma, t_x, t_y, t_z, f\}$ (e.g., three rotation parameters, three translation parameters, and a focal length parameter), may be estimated by minimizing the overall distance between the input landmarks and the reconstructed ones from the model as provided by a distance model or cost function or the like. In an embodiment, the distance model or cost function may be provided by Equation (4):

$$\min_{\rho} \sum_{i=1}^{N} \|x_i^{2d} - P(M(X_i^{3d}))\|^2 \quad (4)$$

The distance model or cost function provided by Equation (4) is non-linear and may be solved for camera and pose parameters 104, $\rho$, using any suitable technique or techniques. In an embodiment, the distance model or cost function may be solved for camera and pose parameters 104 based on a non-linear optimization solver such as a Levenberg-Marquardt technique. As is discussed further below, camera and pose parameters 104, ρ, may be refined or improved using iterative processing. For example, the distance model or cost function provided by Equation (4) may be repeated using updated 2D and 3D facial landmarks. At subsequent iterations, the 2D and 3D facial landmarks may include both internal and contour landmarks. Furthermore, the 3D morphable face model may be implemented with spatial parameters as determined at second stage 122 such that the rendered face image more closely matches the face image of input image 101. Such techniques may thereby refine camera and pose parameters using iterative processing.

In an embodiment, camera and pose parameters 104, ρ, may be determined using a binary search scheme to determine an optimal focal length, f. In an embodiment, multiple focal length candidates (e.g., 10 or fewer candidates) are preselected and remaining camera and pose parameters 104, ρ, and a corresponding cost are determined using the distance model or cost function provided by Equation (4) or the like for each of the preselected focal lengths. The focal length and remaining camera and pose parameters 104 corresponding to the minimal cost of the costs are then used as the final camera and pose parameters 104. In another embodiment, a first focal length is selected and a binary search scheme based on the remaining camera and pose parameters 104 and corresponding cost as determined using the distance model or cost function provided by Equation (4) or the like are used to determine a final focal length and corresponding remaining camera and pose parameters 104.

Figure 4:
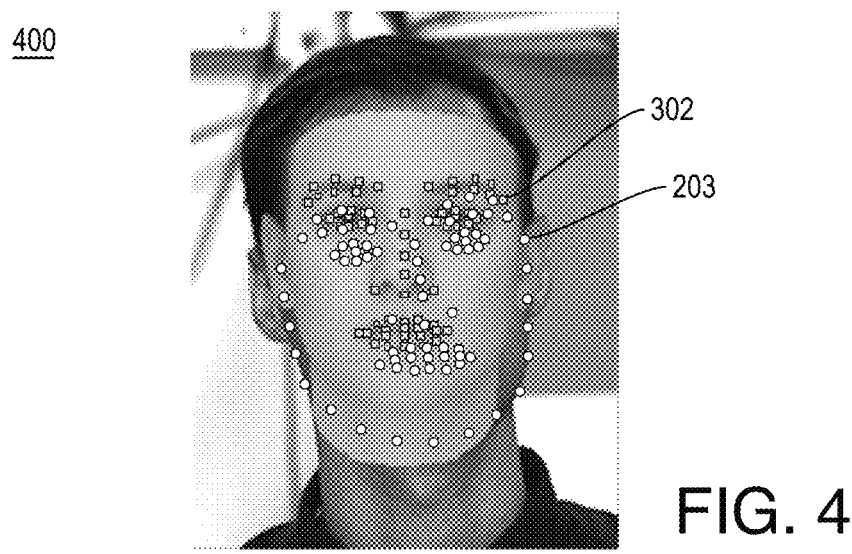
FIG. 4 illustrates an example overlay of initial 2D landmarks and initial 3D landmarks.

FIG. 4 illustrates an example overlay 400 of initial 2D landmarks 203 and initial 3D landmarks 302, arranged in accordance with at least some implementations of the present disclosure. As shown in FIG. 4, initial 2D landmarks 203 (each labeled as solid white circles) as provided by input image with 2D landmarks 102 may be substantially misaligned with initial 3D landmarks 302 (each labeled as a solid gray square) as provided by 3D morphable face model with 3D landmarks 103 (please refer also to FIGS. 2 and 3). With reference to FIG. 1, camera and pose estimation module 132 may determine camera and pose parameters 104 that attempt to align initial 2D landmarks 203 and initial 3D landmarks 302 as is illustrated further herein with respect to FIG. 8. Furthermore, during the discussed first iteration of alignment, camera and pose estimation module 132 may determine camera and pose parameters 104 based on internal facial landmarks only (e.g., without use of contour landmarks that are not yet determined for the 3D morphable face model).

Returning now to FIG. 1, as shown, camera and pose parameters 104 may be provided to contour determination and matching module 133. Contour determination and matching module 133 determines a contour of the 3D morphable face model and matches particular points of the contour to 2D contour landmarks of input image with 2D landmarks 102 as is discussed further below. Such matched contour landmarks (CLMs) 105 are provided to camera and pose estimation module 132, which may repeat the determination of camera and pose parameters 104 as discussed with the exception that, with the determination of 3D contour landmarks 105, both internal and contour landmarks may be used to determine of camera and pose parameters 104. As shown, the updated camera and pose parameters 104 may then be used by contour determination and matching module 133 to determine updated 3D contour landmarks 105, which are again provided to camera and pose estimation module 132 to again update camera and pose parameters 104. Such iterative processing may be repeated any number of times such as twice, three times, four times, or the like. For example, the iterative processing may be performed a predetermined number of times. As discussed, during a first iteration of determining camera and pose parameters 104 only internal 2D and 3D facial landmarks are available and used. In subsequent iterations, both internal and contour (e.g., outer) 2D and 3D facial landmarks may be used. After the completion of such iterative processing (or after only a single iteration), final camera and pose parameters (CPP) 106 are provided to linear shape estimation module 134 of second stage 122 for processing as is discussed further herein.

Contour determination and matching module 133 may determine 3D contour landmarks 105 of the 3D morphable model using any suitable technique or techniques. In some embodiments, 3D contour landmarks 105 may be characterized as 3D contour landmarks and may be landmarks determined from an implementation of the 3D morphable face model of 3D morphable face model with 3D landmarks 103. In an embodiment, based on camera and pose parameters 104, contour determination and matching module 133 determines 3D point positions on the 3D morphable model (at this stage as implemented with initial shape parameters as discussed above) that correspond to the 2D contour landmarks of input image with 2D landmarks 102. In an embodiment, mesh triangles of the 3D morphable face model are organized into lines of triangles as shown in FIG. 5.

Figure 5:
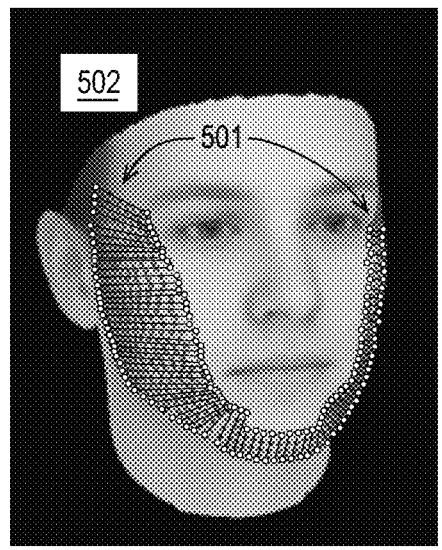
FIG. 5 illustrates example lines of mesh triangles for an example 3D morphable face model.

FIG. 5 illustrates example lines of mesh triangles 501 for an example 3D morphable face model 502, arranged in accordance with at least some implementations of the present disclosure. As shown in FIG. 5, lines of mesh triangles 501 may include a start mesh triangle (illustrated by a solid white circle) and an end mesh triangle (illustrated by another solid white circle) connected by any number of intervening mesh triangles (along the line connecting the start and end mesh triangles). Lines of mesh triangles 501 may be characterized as lines or scrapes or the like. Furthermore, although discussed with respect to mesh triangles of 3D morphable face model 502 any suitable feature or features of 3D morphable face model 502 may be used such as vertices, points, or the like. Such lines of mesh triangles 501 may be oriented in any suitable manner. In the illustration of FIG. 5, lines of mesh triangles 501 substantially align from an outer edge of 3D morphable face model 502 toward a center point of 3D morphable face model 502. In an embodiment, lines of mesh triangles 501 are all horizontal. In an embodiment, lines of mesh triangles 501 are all vertical. However, as discussed, any orientation or orientations may be used.

Returning to FIG. 1, contour determination and matching module 133 may then select a mesh triangle from each line of mesh triangles to determine a contour of the 3D morphable face model. Contour determination and matching module 133 may select each mesh triangle using any suitable technique or techniques. In an embodiment, the mesh triangles of the 3D morphable face model may be rendered using multiple rendering targets techniques and selecting each mesh triangle may include determining the mesh triangles that are visible (e.g., not occluded) and selecting a first of the visible mesh triangles from each line to generate contour of mesh triangles that provide a candidate set for matching the 2D landmarks.

Figure 6:
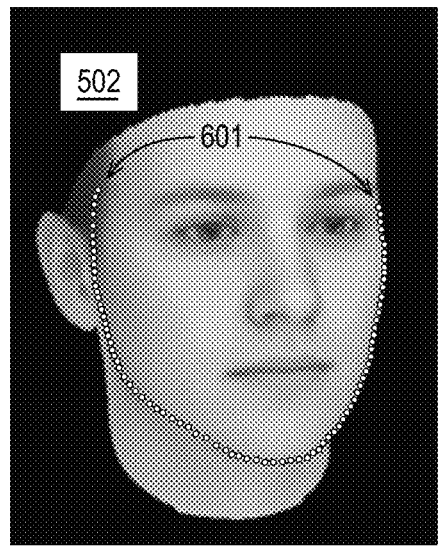
FIG. 6 illustrates an example contour of mesh triangles for an example 3D morphable face model.

FIG. 6 illustrates an example contour of mesh triangles 601 for example 3D morphable face model 502, arranged in accordance with at least some implementations of the present disclosure. As shown in FIG. 6, contour of mesh triangles 601 includes multiple mesh triangles that follows a contour of 3D morphable face model 502. As discussed, contour of mesh triangles 601 provides a candidate set of mesh triangles for matching 2D landmarks as is discussed further below.

Returning to FIG. 1, contour determination and matching module 133 may next select from the contour of mesh triangles to determine 3D contour landmarks of the 3D morphable face model. Contour determination and matching module 133 may select the 3D contour landmarks using any suitable technique or techniques. In an embodiment, the center position of the mesh triangles are projected onto the image plane of input image with 2D landmarks 102 and for each of the 2D contour landmarks of input image with 2D landmarks 102, a closest (e.g., geometrically closest in the image plane) mesh triangle from the contour of mesh triangles is selected for each of the 2D contour landmarks to provide corresponding 3D contour landmarks of the 3D morphable face model.

Figure 7:
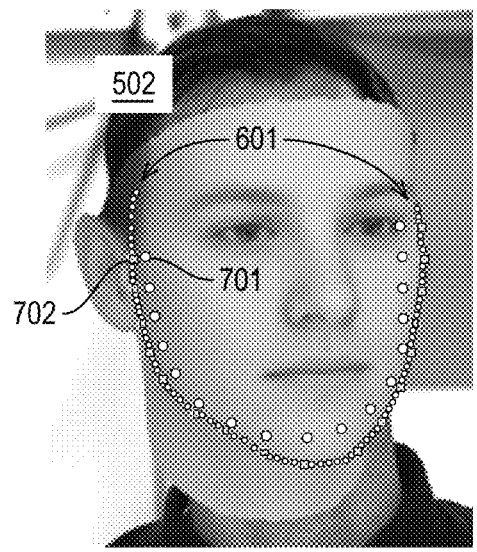
FIG. 7 illustrates example selected 3D contour landmarks for an example 3D morphable face model based on example 2D contour landmarks.

FIG. 7 illustrates example selected 3D contour landmarks 702 for example 3D morphable face model 502 based on example 2D contour landmarks 701, arranged in accordance with at least some implementations of the present disclosure. As shown in FIG. 7, contour of mesh triangles 601 for 3D morphable face model 502 (as discussed with respect to FIG. 6) may be projected onto the image plane of 2D contour landmarks 701 (illustrated as larger solid white circles), which may be included in input image with 2D landmarks 102 as discussed. 3D contour landmarks 702 are then selected as those mesh triangles of contour of mesh triangles 601 closest (e.g., geometrically closest in the 2D image plane) to 2D contour landmarks 701. As discussed, contour landmarks 702 are then provided as 3D contour landmarks 105.

Returning to FIG. 1, using the discussed techniques, contour determination and matching module 133 provides automatic 3D contour landmarks determination based on, for example, marking a mesh of vertices on a contour region into lines or scrapes or the like, selecting one vertex from each line or scrape to generate a contour curve of vertices, and determining the final 3D contour landmarks as those closest to 2D contour landmarks.

As discussed, camera and pose estimation module 132 may receive 3D contour landmarks 105 and camera and pose estimation module 132 may again determine (e.g., refined or improved) camera and pose parameters 104 based on aligning all 2D landmarks (e.g., inner and contour) and corresponding 3D landmarks (e.g., inner and contour) using the techniques discussed above. Furthermore, the discussed 3D contour landmark determination may be repeated and returned to camera and pose estimation module 132 and so on with such iterative processing being repeated any number of times.

Figure 8:
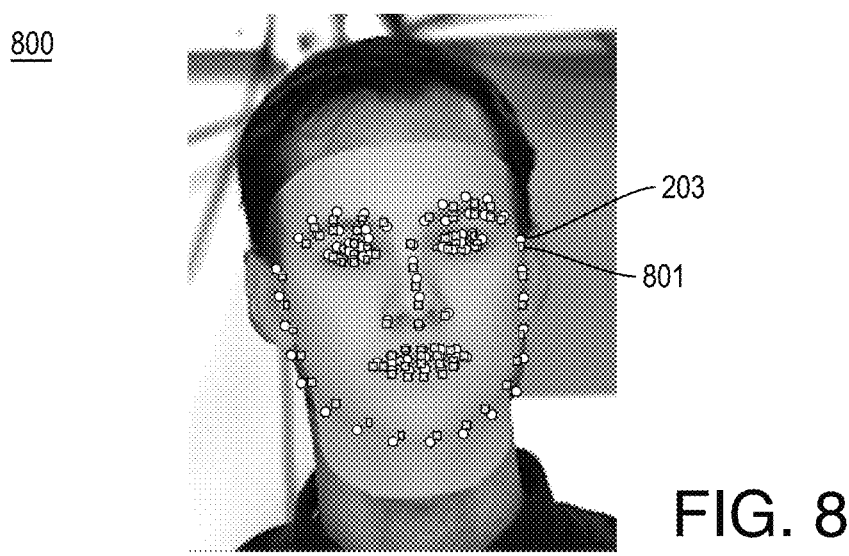
FIG. 8 illustrates an example overlay of 2D landmarks and 3D landmarks based on an example 3D morphable face model moved using camera and pose parameters.

FIG. 8 illustrates an example overlay 800 of 2D landmarks 203 and 3D landmarks 801 based on an example 3D morphable face model moved using camera and pose parameters, arranged in accordance with at least some implementations of the present disclosure. As shown in FIG. 8, 2D landmarks 203 (each labeled as solid white circles) as provided by input image with 2D landmarks 102 may be substantially aligned with 3D landmarks 801 (each labeled as a solid gray square) as provided by the 3D morphable face model implemented with initial parameters (e.g., mean parameters or shape and texture parameters of zero) as altered by camera and pose parameters 106. As discussed, camera and pose estimation module 132 may determine camera and pose parameters 106 that attempt to align 2D landmarks 203 and 3D landmarks 801. Subsequent processing may morph the 3D morphable face model (e.g., determine shape parameters for implementation by the 3D morphable face model) to further align the 2D and 3D landmarks.

Returning to FIG. 1, after such iterative processing, camera and pose parameters 106, along with any other of input image with 2D landmarks 102, 3D morphable face model with 3D landmarks 103, and 3D contour landmarks 105, are provided to linear shape estimation module 134 of second stage 122. Linear shape estimation module 134 may, based on matching the 2D and 3D landmarks and based on camera and pose parameters 106, determine shape parameters 107, 108 for the implementation of the 3D morphable model. As shown, during a first and subsequent (if any) iterations, shape parameters 107 may be provided to camera and pose estimation module 132, which may generate camera and pose parameters 104, which may be provided to contour determination and matching module 133, which may generate camera and pose parameters 106, which may be provided to linear shape estimation module 134, which may again generate shape parameters 107, 108. Such iterative processing may be performed any number of times such as twice, three times, four times, or the like. For example, the iterative processing may be performed a predetermined number of times. After such iterative processing, linear shape estimation module 134 of second stage 122 may provide shape parameters 108 to texture estimation module 135 of third stage 123.

For example, the 3D morphable face model, as discussed, implements shape and texture parameters to provide a 3D face model (e.g., the 3D morphable face model is morphable based on the shape and texture parameters). In an embodiment, linear shape estimation module 134 may determine shape parameters that optimize a linear spatial estimation cost model. For example, the linear spatial estimation cost model may be based on 2D facial landmarks corresponding to the human face of input image with 2D landmarks 102, corresponding 3D facial landmarks of the 3D morphable face model as implemented with the shape parameters, and camera and pose parameters 106 that align the 2D facial landmarks and the 3D facial landmarks. In an embodiment, linear shape estimation module 134 determines shape parameters, $\alpha$, as discussed with respect to Equations (1) above. The discussed techniques may provide a linear cost model or method to determine shape parameters based on the camera perspective (e.g., based on camera and pose parameters 106). In an embodiment, the shape parameters are determined by optimizing a linear spatial estimation cost model based, in part, on the camera and pose parameters. In an embodiment, the shape parameters are determined by optimizing a cost function based on Equation (5):

$$\min_{\alpha}\left(\sum_{i=1}^{i=N} \|P(M(X_i^{3d})) - x_i^{2d}\|^2 + \frac{\lambda}{2}\|\alpha\|^2\right) = \\ \min_{\alpha}\left(\sum_{i=1}^{i=N} \|P(M(\hat{S}_i\alpha + \bar{s}_i)) - x_i^{2d}\|^2 + \frac{\lambda}{2}\|\alpha\|^2\right) \quad (5)$$

where the vector $\bar{s}_i \in \mathbb{R}^{3 \times 1}$ is the 3D position of the $i^{th}$ landmark from the mean shape of the 3D morphable model, $\hat{S}_i \in \mathbb{R}^{3 \times m-1}$ is the subset of the eigenvector matrix associated with the $i^{th}$ landmark, $\lambda$ is a weighting parameter (e.g., a scalar parameter having a value of 1.0 or the like) and $\|\alpha\|^2$ is a regularization term, and N is the number of landmarks (e.g., about 78 landmarks or the like).

The cost function provided by Equation (5) may be provided for solving using a linear cost model by constructing a transformation matrix, $C_i \in \mathbb{R}^{3 \times 4}$, for each 3D landmark. For example, assuming C is an overall transformation matrix from a 3D vertex to an image pixel (e.g., the projection matrix may be multiplied by the model-view matrix to attain the overall transformation matrix), the first two rows of $C_i$ may be copied from the first two rows of C and each element may be divided by $-Z_c^i$ (e.g., to invert and scale each transformation matrix), and the third row of $C_i$ may be set to (0, 0, 0, 1). A solution of the cost function provided by Equation (5) may then be provided by a closed-form expression as shown in Equation (6):

$$\alpha = -(A^T A + \lambda I)^{-1}(A^T b) \qquad (6)$$

where the following may be set: $A = Q\hat{S}$ and $b = Q\hat{S} - X^{2d}$, $Q \in \mathbb{R}^{3N \times 4N}$ is a block diagonal matrix formed by $C_i$ placed on the diagonal. The matrix $X^{2d} \in \mathbb{R}^{3N \times 1}$ may then be concatenated by homogeneous coordinates of the 2D landmarks. The matrix $\hat{S} \in \mathbb{R}^{4N \times m-1}$ (e.g., an eigenvector matrix) may then be constructed by selecting rows of the eigenvector matrix associated with the N feature points, and then inserting a row of zeros after every third row. The matrix $\overline{S} \in \mathbb{R}^{4N \times 1}$ is concatenated by the homogeneous coordinates of the N landmarks (e.g., feature points) from the mean shape of the 3D morphable face model.

As discussed, shape parameters 107 may be provided for iterative processing by camera and pose estimation module 132, contour determination and matching module 133, and linear shape estimation module 134 (e.g., iterative processing by first stage 121 and second stage 122). After completion of such iterative processing, shape parameters 108 to texture estimation module 135 of third stage 123.

Figure 9:
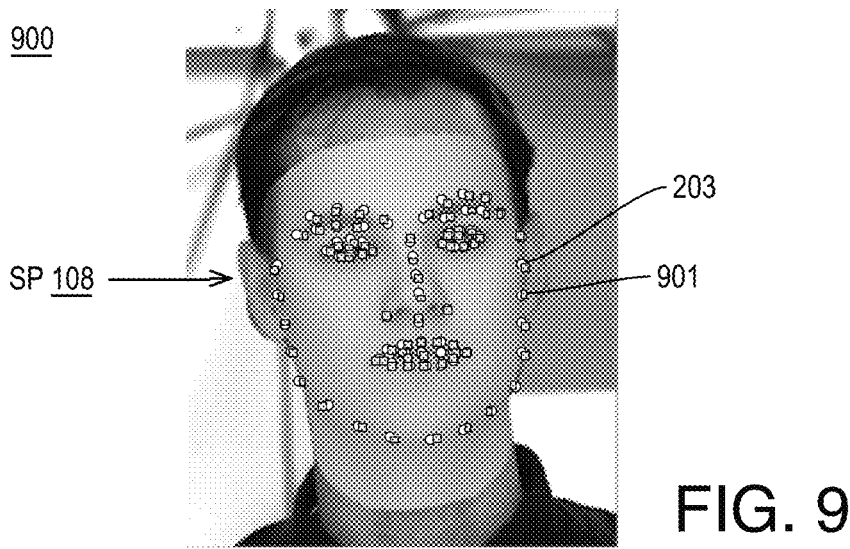
FIG. 9 illustrates an example overlay of 2D landmarks and 3D landmarks based on an example 3D morphable face model moved using camera and pose parameters and morphed based on shape parameters.

FIG. 9 illustrates an example overlay 900 of 2D landmarks 203 and 3D landmarks 901 based on an example 3D morphable face model moved using camera and pose parameters and morphed based on shape parameters 108, arranged in accordance with at least some implementations of the present disclosure. As shown in FIG. 9, 2D landmarks 203 (each labeled as solid white circles) as provided by input image with 2D landmarks 102 may be substantially further aligned with 3D landmarks 901 (each labeled as solid gray squares) as provided by the 3D morphable face model implemented with shape parameters 108 and as altered by camera and pose parameters 106. As discussed, linear shape estimation module 134 may determine shape parameters 108 that attempt to align 2D landmarks 203 and 3D landmarks 901. Subsequent processing may further refine the morphing of the 3D morphable face model (e.g., determine refined shape parameters for implementation by the 3D morphable face model) to further align the 2D and 3D landmarks.

Figure 10:
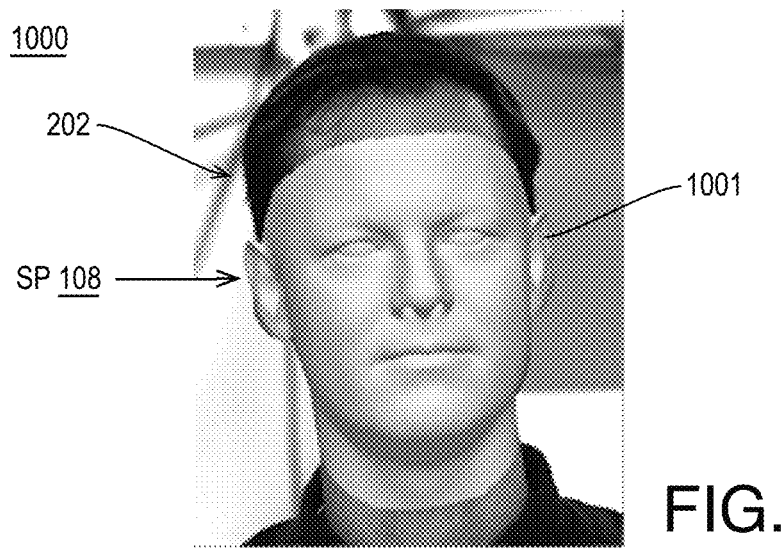
FIG. 10 illustrates an example overlay of an input image having a human face and an example 3D morphable face model moved using camera and pose parameters and morphed based on shape parameters.

FIG. 10 illustrates an example overlay 1000 of an input image having human face 202 and a 3D morphable face model 1001 moved using camera and pose parameters and morphed based on shape parameters, arranged in accordance with at least some implementations of the present disclosure. As shown in FIG. 10, 3D morphable face model 1001 may be substantially aligned with human face 202. As discussed, linear shape estimation module 134 may determine shape parameters 108 that attempt to align 3D morphable face model 1001 with human face 202. Subsequent processing may further refine the morphing of the 3D morphable face model (e.g., determine refined shape parameters for implementation by the 3D morphable face model) to further align it to human face 202.

Returning to FIG. 1, after such iterative processing, shape parameters 108, along with any other of input image with 2D landmarks 102, 3D morphable face model with 3D landmarks 103, 3D contour landmarks 105, and camera and pose parameters 106, are provided to linear texture estimation module 135 of third stage 123. Linear texture estimation module 135 may determine, based on pixel colors at locations of input image 102 and pixel colors of corresponding locations of the 3D morphable face model as implemented with shape parameters 108 and texture parameters 109, texture parameters that optimize a linear texture estimation cost model. Linear texture estimation module 135 may determine texture parameters 109 using any suitable technique or techniques. In an embodiment, an assumption may be made that the morphable model as implemented with shape parameters 108 is aligned with the human face of input image 102. In an embodiment, the texture parameters are determined by optimizing a cost function based on Equation (5):

$$\min_{\beta}\left(\sum_{x,y} \|I_{model}(x,y) - I_{input}(x,y)\|^2 + \frac{\lambda}{2}\|\beta\|^2\right) = \qquad (7)$$

$$\min_{\beta}\left(\sum_{k \leftarrow (x,y)} \|(\hat{T}_k \beta + \hat{t}_k) - I_{input}(x,y)\|^2 + \frac{\lambda}{2}\|\beta\|^2\right)$$

where $I_{input}(x, y) \in \mathbb{R}^{3 \times 1}$ is an input image pixel color at location (x, y), the vector $\bar{t}_k \in \mathbb{R}^{3 \times 1}$ is the mean texture color of the sampling triangle center that is projected to image pixel (x, y), $\hat{T}_k \in \mathbb{R}^{3 \times m-1}$ is the subset of the eigenvector matrix associated with the sampling triangle center.

The cost function provided by Equation (7) may be provided for solving using a linear cost model based on a close-form expression as shown in Equation (8):

$$\beta = -(\hat{T}^T \hat{T} + \lambda I)^{-1}(\hat{T}^T(\overline{T} - I_{input})) \qquad (8)$$

where the matrix $\hat{T} \in \mathbb{R}^{3n \times m-1}$ is constructed by selecting the rows of the eigenvector matrix associated with the n samples, the matrix $\hat{T} \in \mathbb{R}^{3n \times 1}$ is constructed by selecting the mean texture associated with the n sample points, the matrix $I_{input} \in \mathbb{R}^{3n \times 1}$ is concatenated by the image pixel colors of the n sampling points.

Figure 11:
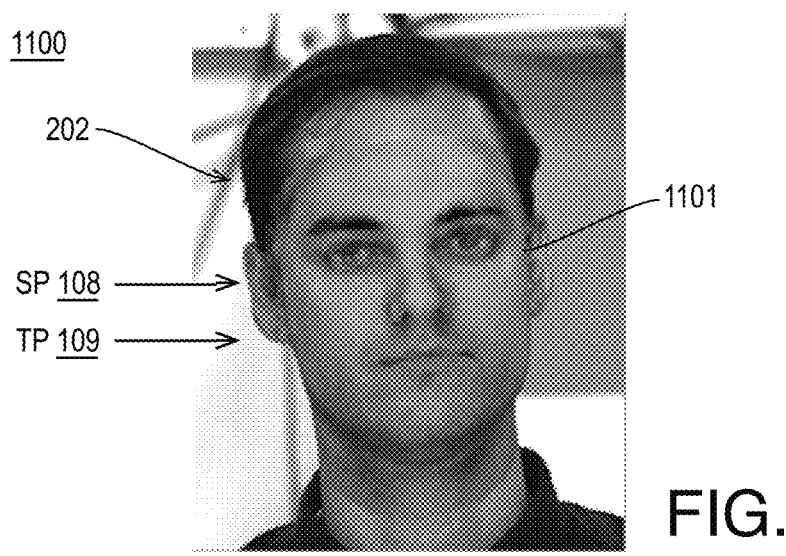
FIG. 11 illustrates an example overlay of an input image having a human face and an example 3D morphable face model moved using camera and pose parameters and morphed based on shape and texture parameters.

FIG. 11 illustrates an example overlay 1100 of an input image having human face 202 and a 3D morphable face model 1101 moved using camera and pose parameters and morphed based on shape and texture parameters, arranged in accordance with at least some implementations of the present disclosure. As shown in FIG. 11, 3D morphable face model 1101 as implemented using shape parameters 108 and texture parameters 109 may be substantially aligned with human face 202 and may substantially match the texture thereof. As discussed, shape refinement module 136 and texture estimation module 135 may iteratively determine 3D morphable face model parameters 111 (i.e., shape and texture parameters) that attempt to further align and texture match 3D morphable face model 1101 (as implemented with the parameters) with human face 202.

Returning to FIG. 1, texture parameters 109 may be provided from linear texture estimation module 135 to shape refinement module 136. At a first iteration, shape refinement module 136 may generate shape parameters 110 based on shape parameters 108 and texture parameters 109. As shown, shape parameters 110 may then be provided for a second iteration to linear texture estimation module 135, which may generate (refined) texture parameters 109, which may, in turn, be used to generate (refined) shape parameters 110. Such iterative processing may be performed any number of times such as twice, three times, four times, or the like. For example, the iterative processing may be performed a predetermined number of times. After such iterative processing, third stage 123 may provide 3D morphable face model (3DMM) parameters 111 including finalized shape and texture parameters.

Shape refinement module 136 may generate shape parameters 110 based on shape parameters 108 and texture parameters 109 using any suitable technique or techniques. In an embodiment, shape refinement module 136 refine shape parameters 108 by optimizing a nonlinear pixel intensity cost function. In an embodiment, the nonlinear pixel intensity cost function is based on pixel intensity values of the input image (e.g., input image 102) at multiple locations (e.g., pixel locations) and pixel intensity values of corresponding locations of the 3D morphable face model (e.g., projected onto the 2D image plane) as implemented with the refined shape parameters and texture parameters 109.

In an embodiment, the refined shape parameters are determined by optimizing a cost function based on Equation (9):

$$\min_\alpha \left( \sum_{x,y} \|I_{model}(x, y) - I_{input}(x, y)\|^2 + \frac{\lambda}{2}\|\alpha\|^2 \right) = \min_\alpha \left( \sum_{k \in \mathcal{K}} \|(I_{model}(k) - I_{input}(p_{x,k}, p_{y,k}))\|^2 + \frac{\lambda}{2}\|\alpha\|^2 \right) \quad (9)$$

where $\mathcal{K}$ is the set of triangles of the 3D morphable face model sampled for the shape parameters refinement (which can be obtained from the rendering texture), $I_{model}(k)$ is the texture color of the $k^{th}$ triangle, $p_{x,k}$, $p_{y,k}$ are pixel coordinates that are transformed from 3D positions of the 3D morphable face model and are related with the refined shape parameters, $\alpha$.

In the optimization cost function provided by Equation (9), only shape parameters, a, are unknown. The optimization cost function can be minimized using any suitable optimization technique or techniques such as Levenberg-Marquardt techniques or the like. As discussed, after the determination of shape parameters 110, iterative processing may be performed such that new texture parameters 109 are determined by linear texture estimation module 135 as discussed, which may be used to generate new shape parameters 110 by shape refinement module 136 also as discussed. Such iterative processing may be repeated any number of times to generate 3D morphable face model (3DMM) parameters 111 including finalized shape and texture parameters.

Figure 12:
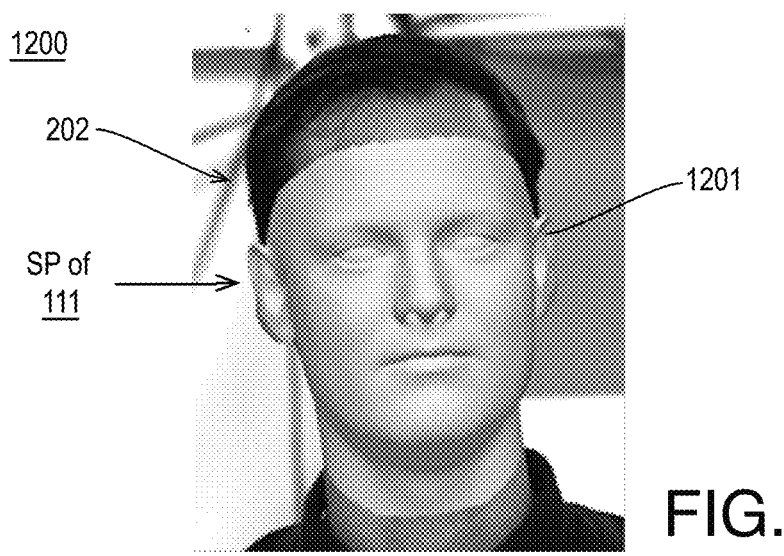
FIG. 12 illustrates an example overlay of an input image having a human face and an example 3D morphable face model moved using camera and pose parameters and morphed based on refined shape parameters.

FIG. 12 illustrates an example overlay 1200 of an input image having human face 202 and a 3D morphable face model 1201 moved using camera and pose parameters and morphed based on refined shape parameters, arranged in accordance with at least some implementations of the present disclosure. As shown in FIG. 12, 3D morphable face model 1201 may be substantially aligned with human face 202 with refined features. As discussed, shape refinement module 136 may determine shape parameters of 3D morphable face model parameters 111 that attempt to align 3D morphable face model 1201 (as implemented with the shape parameters) with human face 202.

Returning to FIG. 1, as discussed, third stage 123 may provide 3D morphable face model (3DMM) parameters 111 including finalized shape and texture parameters. The model parameters (e.g., 3D morphable face model parameters 111) may be stored in memory, transmitted to another device, or the like. In an embodiment, 3D morphable face model parameters 111 are stored for use by a 3D face processing application. In an embodiment, 3D morphable face model parameters 111 are transmitted to another device for use by a 3D face processing application. The 3D face processing application may be any suitable application performed by system 100 or another device. For example, the 3D face processing application may be a face recognition application, a face relighting application, a face beautification application, a facial animation application, a face tracking across 3D poses application, a facial expression transfer application, or the like.

Figure 13:
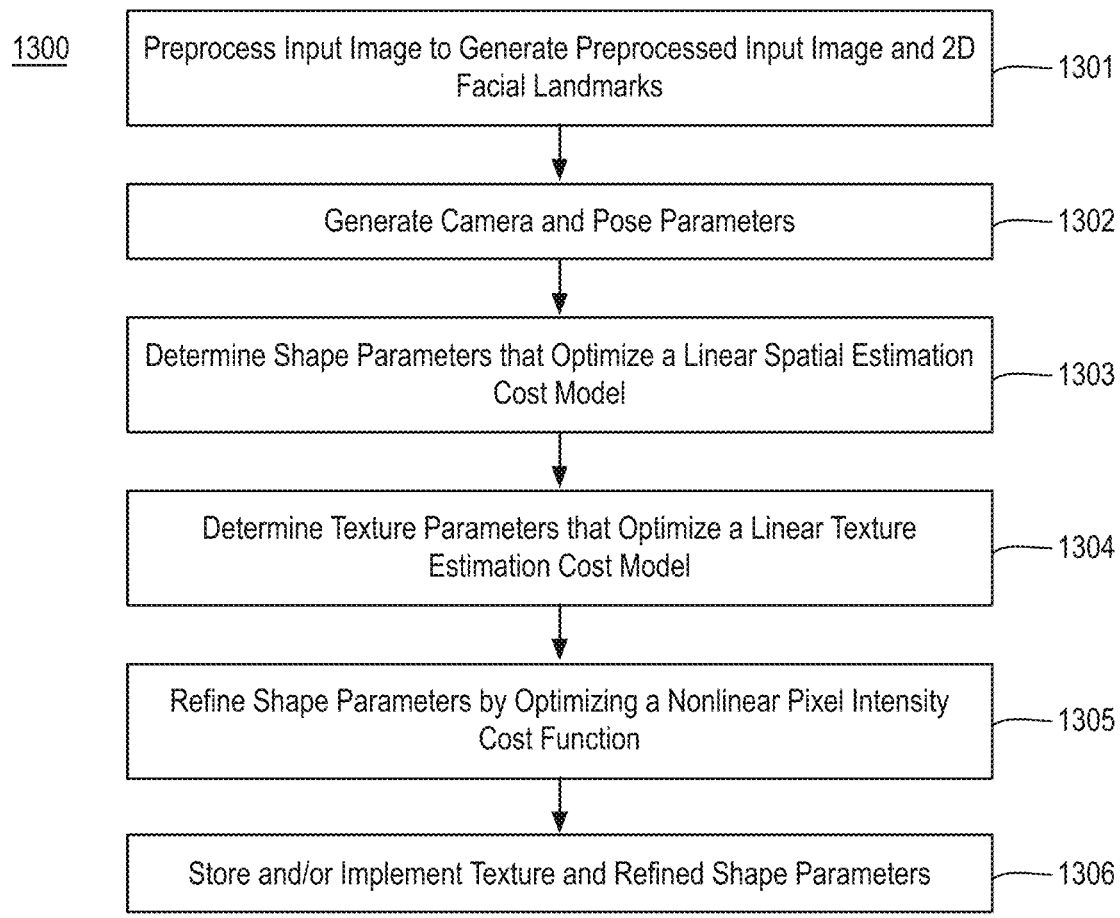
FIG. 13 is a flow diagram illustrating an example process for implementing a 3D morphable face model.

FIG. 13 is a flow diagram illustrating an example process 1300 for implementing a 3D morphable face model, arranged in accordance with at least some implementations of the present disclosure. Process 1300 may include one or more operations 1301-1306 as illustrated in FIG. 13. Process 1300 may form at least part of a 3D morphable face model implementation technique. By way of non-limiting example, process 1300 may form at least part of a 3D morphable face model implementation technique performed by system 100 as discussed herein. Furthermore, process 1300 will be described herein with reference to system 1400 of FIG. 14.

Figure 14:
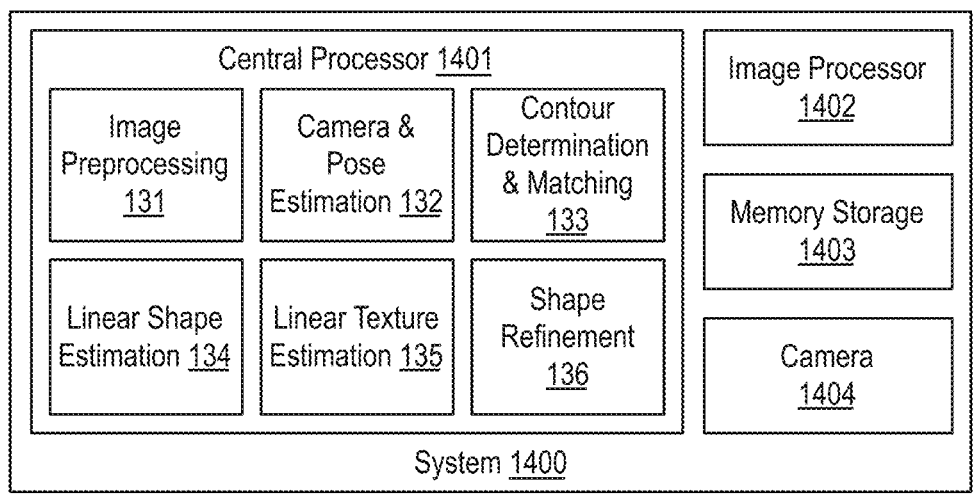
FIG. 14 is an illustrative diagram of an example system for implementing a 3D morphable face model.

FIG. 14 is an illustrative diagram of an example system 1400 for implementing a 3D morphable face model, arranged in accordance with at least some implementations of the present disclosure. As shown in FIG. 14, system 1400 may include a central processor 1401, an image processor 1402, a memory storage 1403, and a camera 1404. For example, camera 1404 and a display (not shown) may acquire an input image for processing and display a 3D morphable face model based image, respectively. Also as shown, central processor 1401 may include or implement image preprocessing module 131, camera and pose estimation module 132, contour determination and matching module 133, linear shape estimation module 134, texture estimation module 135, and shape refinement module 136. Such components or modules may be implemented to perform operations as discussed herein. Memory storage 1403 may store images, image data, input images, image sensor data, face detection data, facial landmarks, shape parameters, texture parameters, camera and pose parameters, or any other data discussed herein.

As shown, in some examples, image preprocessing module 131, camera and pose estimation module 132, contour determination and matching module 133, linear shape estimation module 134, texture estimation module 135, and shape refinement module 136 may be implemented via central processor 1401. In other examples, one or more or portions of image preprocessing module 131, camera and pose estimation module 132, contour determination and matching module 133, linear shape estimation module 134, texture estimation module 135, and shape refinement module 136 may be implemented via image processor 1402, a video processor, a graphics processor, or the like. In yet other examples, one or more or portions of image preprocessing module 131, camera and pose estimation module 132, contour determination and matching module 133, linear shape estimation module 134, texture estimation module 135, and shape refinement module 136 may be implemented via an image or video processing pipeline or unit.

Image processor 1402 may include any number and type of graphics, image, or video processing units that may provide the operations as discussed herein. In some examples, image processor 1402 may be an image signal processor. Such operations may be implemented via software or hardware or a combination thereof. For example, image processor 1402 may include circuitry dedicated to manipulate frame data, image data, or video data obtained from memory storage 1403. Central processor 1401 may include any number and type of processing units or modules that may provide control and other high level functions for system 1400 and/or provide any operations as discussed herein. Memory storage 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 1403 may be implemented by cache memory.

In an embodiment, one or more or portions of image preprocessing module 131, camera and pose estimation module 132, contour determination and matching module 133, linear shape estimation module 134, texture estimation module 135, and shape refinement module 136 may be implemented via an execution unit (EU) of image processor 1402. The EU may include, for example, programmable logic or circuitry such as a logic core or cores that may provide a wide array of programmable logic functions. In an embodiment, one or more or portions of image preprocessing module 131, camera and pose estimation module 132, contour determination and matching module 133, linear shape estimation module 134, texture estimation module 135, and shape refinement module 136 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of image preprocessing module 131, camera and pose estimation module 132, contour determination and matching module 133, linear shape estimation module 134, texture estimation module 135, and shape refinement module 136 may be implemented via an application specific integrated circuit (ASIC). The ASIC may include an integrated circuitry customized to perform the operations discussed herein. Camera 1404 may include any camera having any suitable lens and image sensor and/or related hardware for capturing images or video.

Returning to discussion of FIG. 13, process 1300 may begin at operation 1301, where an input image (e.g., an initial input image) may be preprocessed to generate an image ready for processing (e.g., an input image) and 2D facial landmarks. The input image may be preprocessed using any suitable technique or techniques. In an embodiment, the input image is preprocessed by image preprocessing module 131 as implemented by central processor 1401. In an embodiment, the input image is attained by camera 1404. In an embodiment, the preprocessing includes one or more of image smoothing, illumination normalization, and facial landmark detection.

Processing may continue at operation 1302, where an input image, optionally preprocessed, including a representation of a human face and 2D facial landmarks and a 3D morphable face model having 3D facial landmark may be received and camera and pose parameters may be generated.

The camera and pose parameters may be generated or determined using any suitable technique or techniques. In an embodiment, the camera and pose parameters are generated by camera and pose estimation module 132 as implemented by central processor 1401. In an embodiment, the camera and pose parameters are generated by aligning 2D facial landmarks corresponding to the human face of the input image to 3D facial landmarks of the 3D morphable face model. At a first iteration, the 3D morphable face model may be implemented with initiation parameters and the 2D facial landmarks and 3D facial landmarks may include only internal facial landmarks corresponding to at least a mouth, a nose, and an eye. At subsequent iterations, if any, the 3D morphable face model may be implemented with shape parameters (e.g., as determined at operation 1303) and the 2D facial landmarks and 3D facial landmarks may include internal facial landmarks and contour facial landmarks.

In an embodiment, the 3D contour facial landmarks may be determined, at one or more iterations, by generating multiple lines of mesh triangles (or other features such as points or indices) of the 3D morphable face model, selecting a first visible mesh triangle or the like from each of the multiple lines to determine multiple 3D contour facial landmark candidates, and generating the 3D contour facial landmarks of the 3D facial landmarks by selecting, for each contour facial landmark of the 2D facial landmarks, a nearest (e.g., geometrically closest in the 2D image plane) 3D facial landmark of the 3D contour facial landmark candidates.

As discussed, the camera and pose parameters may include three rotation parameters, three translation parameters, and a focal length parameter. In an embodiment, generating the camera and pose parameters includes preselecting multiple focal length candidates, determining remaining camera and pose parameters and a cost value for each of the focal length candidates based on a 2D to 3D facial landmarks distance cost function that aligns the 2D facial landmarks to the second 3D facial landmarks, and selecting the camera and pose parameters as a focal length of the focal length candidates corresponding to a minimum cost value and the remaining camera and pose parameters corresponding to the selected focal length.

Processing may continue at operation 1303, where, for the 3D morphable model, shape parameters may be determined that optimize a linear spatial estimation cost model. The shape parameters may be determined based on a linear spatial estimation cost model using any suitable technique or techniques. In an embodiment, the shape parameters are determined based on a linear spatial estimation cost model by linear shape estimation module 134 as implemented by central processor 1401. In an embodiment, the linear spatial estimation cost model is based on the 2D facial landmarks corresponding to the human face of the input image, corresponding 3D facial landmarks of the 3D morphable face model as implemented with the shape parameters, and the camera and pose parameters to align the 2D facial landmarks and the 3D facial landmarks as determined at operation 1302. In an embodiment, the linear spatial estimation cost model includes a transformation matrix for each 3D facial landmark based on the camera and pose parameters.

Operations 1302 and 1303 may be performed iteratively any number of times to improve or refine the camera and pose parameters and/or the shape parameters. In an embodiment, process 1300 may include iteratively determining the shape parameters for the 3D morphable face model based on the spatial estimation cost model and generating the camera and pose parameters by aligning the 2D facial landmarks to the 3D facial landmarks. As discussed, in iterations subsequent to the first iteration, the 2D facial landmarks and the 3D facial landmarks may include internal facial landmarks and contour facial landmarks, with the contour facial landmarks being reused from a previous iteration or determined as discussed above at the current iteration.

Processing may continue at operation 1304, where, for the 3D morphable model, texture parameters may be determined that optimize a linear texture estimation cost model. The texture parameters may be determined based on a linear texture estimation cost model using any suitable technique or techniques. In an embodiment, the texture parameters are determined based on a linear texture estimation cost model by linear texture estimation module 135 as implemented by central processor 1401. In an embodiment, the linear texture estimation cost model is based on pixel colors of the input image at a plurality of locations and pixel colors of corresponding locations of the 3D morphable face model as implemented with the shape parameters and the texture parameters. In an embodiment, the linear spatial estimation cost model includes a closed-form representation of an initial linear texture estimation cost model.

Processing may continue at operation 1305, where the shape parameters may be refined by optimizing a nonlinear pixel intensity cost function. The refined shape parameters may be determined by optimizing a nonlinear pixel intensity cost function using any suitable technique or techniques. In an embodiment, the refined shape parameters may be determined by shape refinement module 136 as implemented by central processor 1401. In an embodiment, the nonlinear pixel intensity cost function is based on pixel intensity values of the input image at a plurality of second locations and pixel intensity values of corresponding second locations of the 3D morphable face model as implemented with the refined shape parameters and the texture parameters.

Operations 1304 and 1305 may be performed iteratively any number of times to improve or refine the texture parameters and/or the shape parameters. In an embodiment, process 1300 may include determining texture parameters for the 3D morphable face model that optimize the linear texture estimation cost model and refining the shape parameters by optimizing the pixel intensity cost function being repeated iteratively at least twice to generate the texture parameters and the refined shape parameters for the 3D morphable face model.

Processing may continue at operation 1306, where the texture parameters and the refined shape parameters for the 3D morphable face model corresponding to the input image may be stored and/or implemented. In an embodiment, the texture parameters and the refined shape parameters for the 3D morphable face model may be stored to memory storage 1403. In an embodiment, the texture parameters and the refined shape parameters for the 3D morphable face model are stored for use or implementation by a 3D face processing application. The texture parameters and the refined shape parameters for the 3D morphable face model may be retrieved from memory storage by or transmitted for processing or implementation by an applications such as a 3D face processing application. The 3D face processing application may include any suitable application such as a face recognition application, a face relighting application, a face beautification application, a facial animation application, a face tracking across 3D poses application, a facial expression transfer application, or the like.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
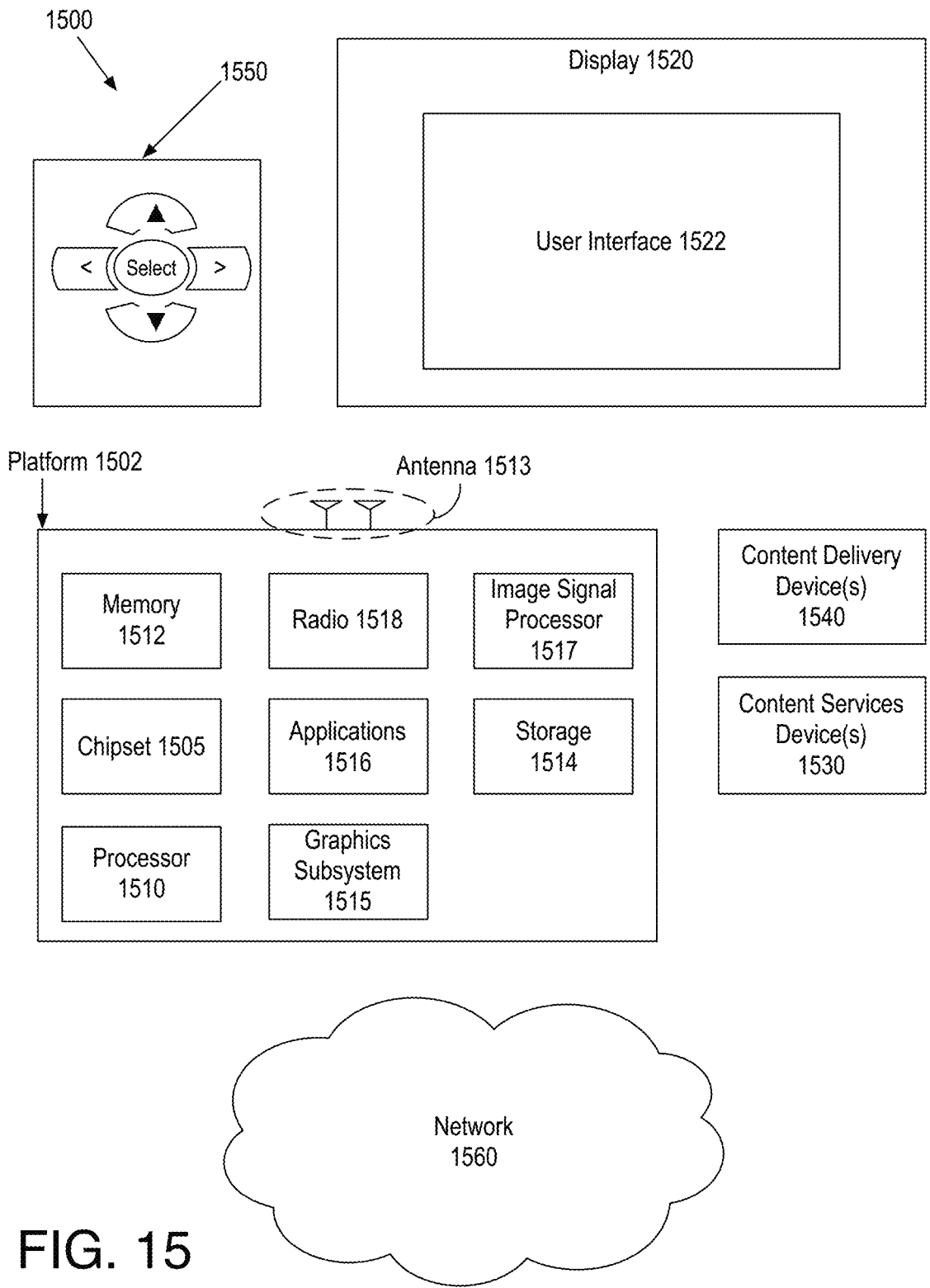
FIG. 15 is an illustrative diagram of an example system.

FIG. 15 is an illustrative diagram of an example system 1500, arranged in accordance with at least some implementations of the present disclosure. In various implementations, system 1500 may be a mobile system although system 1500 is not limited to this context. System 1500 may implement and/or perform any modules or techniques discussed herein. For example, system 1500 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1500 may be implemented via a cloud computing environment.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Image signal processor 1517 may be implemented as a specialized digital signal processor or the like used for image or video frame processing. In some examples, image signal processor 1517 may be implemented based on a single instruction multiple data or multiple instruction multiple data architecture or the like. In some examples, image signal processor 1517 may be characterized as a media processor. As discussed herein, image signal processor 1517 may be implemented based on a system on a chip architecture and/or based on a multi-core architecture.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
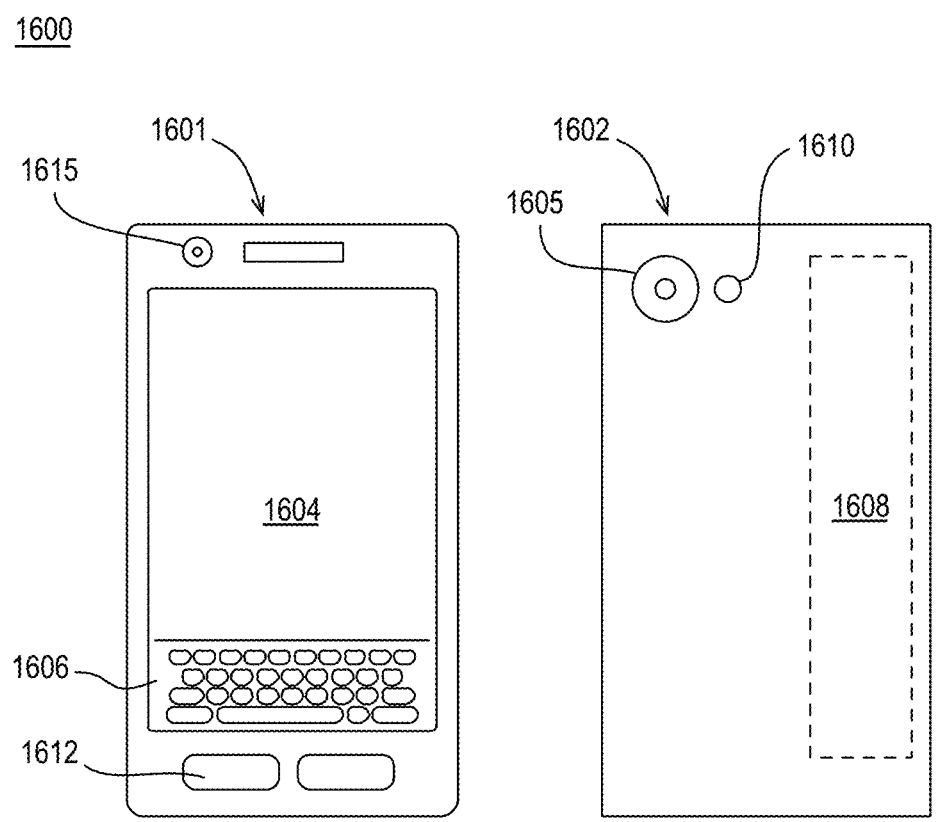
FIG. 16 illustrates an example small form factor device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, camera 1615, a camera 1605, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include camera 1605 and a flash 1610 integrated into back 1602 (or elsewhere) of device 1600 and camera 1615 integrated into front 1601 of device 1600. In some embodiments, either or both of cameras 1615, 1605 may be moveable with respect to display 1604. Camera 1615 and/or camera 1605 may be components of an imaging module or pipeline to originate color image data processed into streaming video that is output to display 1604 and/or communicated remotely from device 1600 via antenna 1608 for example. For example, camera 1615 may capture input images and eye contact corrected images may be provided to display 1604 and/or communicated remotely from device 1600 via antenna 1608.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a machine based method for implementing a 3D morphable face model comprises receiving an input image including a representation of a human face, determining, for the 3D morphable face model, shape parameters that optimize a linear spatial estimation cost model, the linear spatial estimation cost model based on 2D facial landmarks corresponding to the human face of the input image, corresponding 3D facial landmarks of the 3D morphable face model as implemented with the shape parameters, and camera and pose parameters to align the 2D facial landmarks and the 3D facial landmarks, determining, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters, refining the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters, and storing the texture parameters and the refined shape parameters for the 3D morphable face model corresponding to the input image.

Further to the first embodiments, the method further comprises generating the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye.

Further to the first embodiments, the method further comprises generating the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye, wherein the camera and pose parameters comprises a focal length and generating the camera and pose parameters comprises preselecting a plurality of focal length candidates, determining remaining camera and pose parameters and a cost value for each of the focal length candidates based on a 2D to 3D facial landmarks distance cost function that aligns the 2D facial landmarks to the second 3D facial landmarks, and selecting the camera and pose parameters as a focal length of the focal length candidates corresponding to a minimum cost value and the remaining camera and pose parameters corresponding to the selected focal length.

Further to the first embodiments, the method further comprises iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks.

Further to the first embodiments, the method further comprises iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks, wherein, at a particular iteration, the contour facial landmarks of the 3D facial landmarks are determined by generating a plurality of lines of mesh triangles of the 3D morphable face model, selecting a first visible mesh triangle from each of the plurality of lines to determine a plurality of 3D contour facial landmark candidates, and generating the contour facial landmarks of the 3D facial landmarks by selecting, for each contour facial landmark of the 2D facial landmarks, a nearest 3D facial landmark of the 3D contour facial landmark candidates.

Further to the first embodiments, determining texture parameters for the 3D morphable face model that optimize the linear texture estimation cost model and the refining the shape parameters by optimizing the pixel intensity cost function are repeated iteratively at least twice to generate the texture parameters and the refined shape parameters for the 3D morphable face model.

Further to the first embodiments, the linear spatial estimation cost model comprises a transformation matrix for each 3D facial landmark based on the camera and pose parameters.

Further to the first embodiments, the linear texture estimation cost model comprises a closed-form representation of an initial linear texture estimation cost model.

Further to the first embodiments, the method further comprises preprocessing an initial input image to generate the input image and the 2D facial landmarks, wherein the preprocessing comprises image smoothing, illumination normalization, and facial landmark detection.

Further to the first embodiments, the texture parameters and the refined shape parameters for the 3D morphable face model are stored for use by a 3D face processing application and the method further comprises implementing the texture parameters and the refined shape parameters for the 3D morphable face model by the 3D face processing application, the 3D face processing application comprising at least one of a face recognition application, a face relighting application, a face beautification application, a facial animation application, a face tracking across 3D poses application, or a facial expression transfer application.

In one or more second embodiments, a system for implementing a 3D morphable face model comprises memory storage configured to store an input image including a representation of a human face and a processor coupled to the memory, the processor to determine, for the 3D morphable face model, shape parameters that optimize a linear spatial estimation cost model, the linear spatial estimation cost model based on 2D facial landmarks corresponding to the human face of the input image, corresponding 3D facial landmarks of the 3D morphable face model as implemented with the shape parameters, and camera and pose parameters to align the 2D facial landmarks and the 3D facial landmarks, determine, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters, refine the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters, and store the texture parameters and the refined shape parameters for the 3D morphable face model corresponding to the input image to the memory storage.

Further to the second embodiments, the processor is further to generate the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye.

Further to the second embodiments, the processor is further to generate the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye, wherein the camera and pose parameters comprises a focal length and the processor to generate the camera and pose parameters comprises the processor to preselect a plurality of focal length candidates, to determine remaining camera and pose parameters and a cost value for each of the focal length candidates based on a 2D to 3D facial landmarks distance cost function that aligns the 2D facial landmarks to the second 3D facial landmarks, and to select the camera and pose parameters as a focal length of the focal length candidates corresponding to a minimum cost value and the remaining camera and pose parameters corresponding to the selected focal length.

Further to the second embodiments, the processor is further to iteratively determine the shape parameters for the 3D morphable face model based on the spatial estimation cost model and generate the camera and pose parameters by aligning the 2D facial landmarks to the 3D facial landmarks, wherein the 2D facial landmarks and the 3D facial landmarks each comprise internal facial landmarks and contour facial landmarks.

Further to the second embodiments, the processor is further to iteratively determine the shape parameters for the 3D morphable face model based on the spatial estimation cost model and generate the camera and pose parameters by aligning the 2D facial landmarks to the 3D facial landmarks, wherein the 2D facial landmarks and the 3D facial landmarks each comprise internal facial landmarks and contour facial landmarks, wherein, at a particular iteration, the processor to determine the contour facial landmarks of the 3D facial landmarks comprises the processor to generate a plurality of lines of mesh triangles of the 3D morphable face model, to select a first visible mesh triangle from each of the plurality of lines to determine a plurality of 3D contour facial landmark candidates, and to generate the contour facial landmarks of the 3D facial landmarks by selecting, for each contour facial landmark of the 2D facial landmarks, a nearest 3D facial landmark of the 3D contour facial landmark candidates.

Further to the second embodiments, to determine texture parameters for the 3D morphable face model that optimize the linear texture estimation cost model and to refine the shape parameters by optimizing the pixel intensity cost function are repeated iteratively at least twice to generate the texture parameters and the refined shape parameters for the 3D morphable face model.

Further to the second embodiments, the linear spatial estimation cost model comprises a transformation matrix for each 3D facial landmark based on the camera and pose parameters.

Further to the second embodiments, the linear texture estimation cost model comprises a closed-form representation of an initial linear texture estimation cost model.

Further to the second embodiments, the processor is further to preprocess an initial input image to generate the input image and the 2D facial landmarks, wherein the processor to preprocess comprises the processor to perform image smoothing, illumination normalization, and facial landmark detection.

Further to the second embodiments, the texture parameters and the refined shape parameters for the 3D morphable face model are stored for use by a 3D face processing application and the processor is further to implement the texture parameters and the refined shape parameters for the 3D morphable face model by the 3D face processing application, the 3D face processing application comprising at least one of a face recognition application, a face relighting application, a face beautification application, a facial animation application, a face tracking across 3D poses application, or a facial expression transfer application.

In one or more third embodiments, a system comprises means for receiving an input image including a representation of a human face, means for determining, for the 3D morphable face model, shape parameters that optimize a linear spatial estimation cost model, the linear spatial estimation cost model based on 2D facial landmarks corresponding to the human face of the input image, corresponding 3D facial landmarks of the 3D morphable face model as implemented with the shape parameters, and camera and pose parameters to align the 2D facial landmarks and the 3D facial landmarks, means for determining, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters, means for refining the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters, and means for storing the texture parameters and the refined shape parameters for the 3D morphable face model corresponding to the input image.

Further to the third embodiments, the system further comprises means for generating the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye.

Further to the third embodiments, the system further comprises means for iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks.

Further to the third embodiments, the means for determining texture parameters for the 3D morphable face model that optimize the linear texture estimation cost model and the means for refining the shape parameters by optimizing the pixel intensity cost function comprises means for iteratively determining texture parameters and refining the shape parameters to generate the texture parameters and the refined shape parameters for the 3D morphable face model.

Further to the third embodiments, the linear spatial estimation cost model comprises a transformation matrix for each 3D facial landmark based on the camera and pose parameters.

Further to the third embodiments, the linear texture estimation cost model comprises a closed-form representation of an initial linear texture estimation cost model.

In one or more fourth embodiments, at least one machine readable medium comprises a plurality of instructions that, in response to being executed on a device, cause the device to implement a 3D morphable face model by receiving an input image including a representation of a human face, determining, for the 3D morphable face model, shape parameters that optimize a linear spatial estimation cost model, the linear spatial estimation cost model based on 2D facial landmarks corresponding to the human face of the input image, corresponding 3D facial landmarks of the 3D morphable face model as implemented with the shape parameters, and camera and pose parameters to align the 2D facial landmarks and the 3D facial landmarks, determining, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters, refining the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters, and storing the texture parameters and the refined shape parameters for the 3D morphable face model corresponding to the input image.

Further to the fourth embodiments, the machine readable medium further comprises a plurality of instructions that, in response to being executed on the device, cause the device to implement a 3D morphable face model by generating the camera and pose parameters by aligning second 2D facial landmarks corresponding to the human face of the input image to second 3D facial landmarks of the 3D morphable face model implemented with initiation parameters, wherein the second 2D facial landmarks and the second 3D facial landmarks consist of internal facial landmarks corresponding to at least a mouth, a nose, and an eye.

Further to the fourth embodiments, the machine readable medium further comprises a plurality of instructions that, in response to being executed on the device, cause the device to implement a 3D morphable face model by iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks.

Further to the fourth embodiments, the determining texture parameters for the 3D morphable face model that optimize the linear texture estimation cost model and the refining the shape parameters by optimizing the pixel intensity cost function are repeated iteratively at least twice to generate the texture parameters and the refined shape parameters for the 3D morphable face model.

Further to the fourth embodiments, the linear spatial estimation cost model comprises a transformation matrix for each 3D facial landmark based on the camera and pose parameters.

Further to the fourth embodiments, the linear texture estimation cost model comprises a closed-form representation of an initial linear texture estimation cost model.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A machine based method for implementing a 3D morphable face model comprising:
   receiving an input image including a representation of a human face;
   generating camera and pose parameters comprising a focal length by aligning first 2D facial landmarks corresponding to the human face to first 3D facial landmarks of the 3D morphable face model implemented with initiation parameters, wherein the second 2D facial landmarks and the second 3D facial landmarks comprise internal facial landmarks corresponding to at least a mouth, a nose, and an eye, by preselecting a plurality of focal length candidates, determining remaining camera and pose parameters and a cost value for each of the focal length candidates based on a 2D to 3D facial landmarks distance cost function that aligns the 2D facial landmarks to the second 3D facial landmarks, and selecting the camera and pose parameters as a focal length of the focal length candidates corresponding to a minimum cost value and the remaining camera and pose parameters corresponding to the selected focal length;
   determining, for the 3D morphable face model, shape parameters that optimize a linear spatial estimation cost model, the linear spatial estimation cost model based on second 2D facial landmarks corresponding to the human face of the input image, corresponding second 3D facial landmarks of the 3D morphable face model as implemented with the shape parameters, and the camera and pose parameters to align the 2D facial landmarks and the 3D facial landmarks;
   determining, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters;
   refining the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters; and
   storing the texture parameters and the refined shape parameters for the 3D morphable face model corresponding to the input image.

2. The method of claim 1, further comprising:
   iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks.

3. The method of claim 2, wherein, at a particular iteration, the contour facial landmarks of the 3D facial landmarks are determined by:
   generating a plurality of lines of mesh triangles of the 3D morphable face model;
   selecting a first visible mesh triangle from each of the plurality of lines to determine a plurality of 3D contour facial landmark candidates; and
   generating the contour facial landmarks of the 3D facial landmarks by selecting, for each contour facial landmark of the 2D facial landmarks, a nearest 3D facial landmark of the 3D contour facial landmark candidates.

4. The method of claim 1, wherein the determining texture parameters for the 3D morphable face model that optimize the linear texture estimation cost model and the refining the shape parameters by optimizing the pixel intensity cost function are repeated iteratively at least twice to generate the texture parameters and the refined shape parameters for the 3D morphable face model.

5. The method of claim 1, wherein the linear spatial estimation cost model comprises a transformation matrix for each 3D facial landmark based on the camera and pose parameters.

6. The method of claim 1, wherein the linear texture estimation cost model comprises a closed-form representation of an initial linear texture estimation cost model.

7. The method of claim 1, further comprising:
   preprocessing an initial input image to generate the input image and the 2D facial landmarks, wherein the preprocessing comprises image smoothing, illumination normalization, and facial landmark detection.

8. The method of claim 1, wherein the texture parameters and the refined shape parameters for the 3D morphable face model are stored for use by a 3D face processing application, the method further comprising:
   implementing the texture parameters and the refined shape parameters for the 3D morphable face model by the 3D face processing application, the 3D face processing application comprising at least one of a face recognition application, a face relighting application, a face beautification application, a facial animation application, a face tracking across 3D poses application, or a facial expression transfer application.

9. A system for implementing a 3D morphable face model comprising:

memory to store an input image including a representation of a human face; and one or more processors coupled to the memory, the one or more processors to:

generate camera and pose parameters comprising a focal length by aligning first 2D facial landmarks corresponding to the human face to first 3D facial landmarks of the 3D morphable face model implemented with initiation parameters, wherein the second 2D facial landmarks and the second 3D facial landmarks comprise internal facial landmarks corresponding to at least a mouth, a nose, and an eye, by preselecting a plurality of focal length candidates, determining remaining camera and pose parameters and a cost value for each of the focal length candidates based on a 2D to 3D facial landmarks distance cost function that aligns the 2D facial landmarks to the second 3D facial landmarks, and selecting the camera and pose parameters as a focal length of the focal length candidates corresponding to a minimum cost value and the remaining camera and pose parameters corresponding to the selected focal length;

determine, for the 3D morphable face model, shape parameters that optimize a linear spatial estimation cost model, the linear spatial estimation cost model based on second 2D facial landmarks corresponding to the human face of the input image, corresponding second 3D facial landmarks of the 3D morphable face model as implemented with the shape parameters, and the camera and pose parameters to align the 2D facial landmarks and the 3D facial landmarks;

determine, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters;

refine the shape parameters by optimization of a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters; and store the texture parameters and the refined shape parameters for the 3D morphable face model corresponding to the input image to the memory storage.

10. The system of claim 9, wherein the one or more processors are further to iteratively determine the shape parameters for the 3D morphable face model based on the spatial estimation cost model and to generate the camera and pose parameters by alignment of the 2D facial landmarks to the 3D facial landmarks, wherein the 2D facial landmarks and the 3D facial landmarks each comprise the internal facial landmarks and contour facial landmarks.

11. The system of claim 9, wherein to determine texture parameters for the 3D morphable face model that optimize the linear texture estimation cost model and to refine the shape parameters by optimization of the pixel intensity cost function are repeated iteratively at least twice to generate the texture parameters and the refined shape parameters for the 3D morphable face model.

12. The system of claim 9, wherein the linear spatial estimation cost model comprises a transformation matrix for each 3D facial landmark based on the camera and pose parameters.

13. The system of claim 9, wherein the linear texture estimation cost model comprises a closed-form representation of an initial linear texture estimation cost model.

14. The system of claim 9, wherein the one or more processors are further to preprocess an initial input image to generate the input image and the 2D facial landmarks, wherein the preprocess comprises image smoothing, illumination normalization, and facial landmark detection.

15. The system of claim 9, wherein the texture parameters and the refined shape parameters for the 3D morphable face model are stored for use by a 3D face processing application, the one or more processors further to implement the texture parameters and the refined shape parameters for the 3D morphable face model via the 3D face processing application, the 3D face processing application comprising at least one of a face recognition application, a face relighting application, a face beautification application, a facial animation application, a face tracking across 3D poses application, or a facial expression transfer application.

16. At least one non-transitory machine readable medium comprising a plurality of instructions that, in response to being executed on a device, cause the device to implement a 3D morphable face model by:

receiving an input image including a representation of a human face;

generating camera and pose parameters comprising a focal length by aligning first 2D facial landmarks corresponding to the human face to first 3D facial landmarks of the 3D morphable face model implemented with initiation parameters, wherein the second 2D facial landmarks and the second 3D facial landmarks comprise internal facial landmarks corresponding to at least a mouth, a nose, and an eye, by preselecting a plurality of focal length candidates, determining remaining camera and pose parameters and a cost value for each of the focal length candidates based on a 2D to 3D facial landmarks distance cost function that aligns the 2D facial landmarks to the second 3D facial landmarks, and selecting the camera and pose parameters as a focal length of the focal length candidates corresponding to a minimum cost value and the remaining camera and pose parameters corresponding to the selected focal length;

determining, for the 3D morphable face model, shape parameters that optimize a linear spatial estimation cost model, the linear spatial estimation cost model based on second 2D facial landmarks corresponding to the human face, corresponding second 3D facial landmarks of the 3D morphable face model as implemented with the shape parameters, and the camera and pose parameters to align the 2D facial landmarks and the 3D facial landmarks;

determining, for the 3D morphable face model, texture parameters that optimize a linear texture estimation cost model, the linear texture estimation cost model based on pixel colors of the input image at a plurality of locations and pixel colors of corresponding locations of the 3D morphable face model as implemented with the shape parameters and the texture parameters;

refining the shape parameters by optimizing a nonlinear pixel intensity cost function, the nonlinear pixel intensity cost function based on pixel intensity values of the input image at a plurality of second locations and pixel intensity values of corresponding second locations of the 3D morphable face model as implemented with the refined shape parameters and the texture parameters; and storing the texture parameters and the refined shape parameters for the 3D morphable face model corresponding to the input image.

17. The non-transitory machine readable medium of claim 16, the machine readable medium further comprising a plurality of instructions that, in response to being executed on the device, cause the device to implement a 3D morphable face model by:

iteratively determining the shape parameters for the 3D morphable face model based on the spatial estimation cost model and generating the camera and pose parameters by aligning the 2D facial landmarks to the 3D facial landmarks, wherein the 2D facial landmarks and the 3D facial landmarks each comprise internal facial landmarks and contour facial landmarks.

18. The non-transitory machine readable medium of claim 16, wherein the determining texture parameters for the 3D morphable face model that optimize the linear texture estimation cost model and the refining the shape parameters by optimizing the pixel intensity cost function are repeated iteratively at least twice to generate the texture parameters and the refined shape parameters for the 3D morphable face model.

19. The non-transitory machine readable medium of claim 16, wherein the linear spatial estimation cost model comprises a transformation matrix for each 3D facial landmark based on the camera and pose parameters.

20. The non-transitory machine readable medium of claim 16, wherein the linear texture estimation cost model comprises a closed-form representation of an initial linear texture estimation cost model.

21. The non-transitory machine readable medium of claim 16, the machine readable medium further comprising a plurality of instructions that, in response to being executed on the device, cause the device to implement a 3D morphable face model by:

preprocessing an initial input image to generate the input image and the 2D facial landmarks, wherein the preprocessing comprises image smoothing, illumination normalization, and facial landmark detection.

22. The non-transitory machine readable medium of claim 16, wherein the texture parameters and the refined shape parameters for the 3D morphable face model are stored for use by a 3D face processing application, the machine readable medium further comprising a plurality of instructions that, in response to being executed on the device, cause the device to implement the texture parameters and the refined shape parameters for the 3D morphable face model by the 3D face processing application, the 3D face processing application comprising at least one of a face recognition application, a face relighting application, a face beautification application, a facial animation application, a face tracking across 3D poses application, or a facial expression transfer application.

* * * * *